United States Patent
Kamiya et al.

(10) Patent No.: US 6,762,146 B2
(45) Date of Patent: Jul. 13, 2004

(54) VANADIUM PHOSPHOROUS MIXED OXIDE

(75) Inventors: Yuichi Kamiya, Ooi-machi (JP); Eiichiro Nishikawa, Miyoshi-machi (JP)

(73) Assignee: Tonen Chemical Corporation, Tokyo (JP)

( * ) Notice: Subject to any disclaimer, the term of this patent is extended or adjusted under 35 U.S.C. 154(b) by 0 days.

(21) Appl. No.: 10/037,826

(22) Filed: Oct. 23, 2001

(65) Prior Publication Data

US 2002/0141927 A1 Oct. 3, 2002

Related U.S. Application Data

(62) Division of application No. 09/604,088, filed on Jun. 27, 2000, now Pat. No. 6,495,486.

(30) Foreign Application Priority Data

| Nov. 10, 1999 | (JP) | 11-319860 |
| Mar. 10, 2000 | (JP) | 2000-67377 |
| Jun. 14, 2000 | (JP) | 2000-178741 |

(51) Int. Cl.$^7$ .......... B01J 31/00; B01J 27/14; B01J 27/186; B01J 27/198; B01J 27/187
(52) U.S. Cl. .......... 502/172; 502/173; 502/208; 502/209; 423/306; 423/594.8
(58) Field of Search .......... 502/208, 209, 502/172, 173; 423/594.8, 306

(56) References Cited

U.S. PATENT DOCUMENTS

| 4,518,534 A | | 5/1985 | Johnson et al. .......... 260/429 R |
| 4,520,127 A | * | 5/1985 | Otake et al. .......... 502/209 |
| 5,072,031 A | | 12/1991 | Hellring .......... 562/8 |
| 5,137,860 A | * | 8/1992 | Ebner et al. .......... 502/209 |
| 5,275,996 A | * | 1/1994 | Andrews et al. .......... 502/209 |
| 5,496,787 A | | 3/1996 | Hatano et al. .......... 502/209 |
| 5,532,385 A | | 7/1996 | Benziger et al. .......... 502/209 |
| 5,773,382 A | * | 6/1998 | Mitchell et al. .......... 502/209 |
| 5,847,163 A | * | 12/1998 | Mazzoni et al. .......... 549/233 |
| 5,885,919 A | | 3/1999 | Bortinger .......... 502/209 |
| 5,905,052 A | * | 5/1999 | Horowitz et al. .......... 502/209 |

FOREIGN PATENT DOCUMENTS

| JP | 08-259208 | 10/1996 |

OTHER PUBLICATIONS

European Search Report dated Mar. 23, 2001: "Molecular Recognition of Alcohols by Layered Compounds with Alternating Organic and Inorganic Layers", 1989 American Chemical Society, 111, 381–383 (Aug. 1988).
"Improved Method of Preparation of Vanadium Phosphate Catalysts", 1997 Elsevier Science, no month avail.
WO 00/13793 published Mar. 16, 2000, First Page Only.
"Coordination Intercalation Reactions of the Layered Compounds VOPO4 and VOAsO4 with Pyridine" Inorg. Chem. 1982, 21, 3820–3825, Johnson, month not avail.
"Intercalative Polymerization of 3–Methyl–and 3,4–Dipethylpyrrole in the VOPO4 Interlayer Space" Chemistry Letters, pp. 31–34, 1993, Matsubayashi, month not avail.
"Effective of Additives on the Active Sites of (VO)2P2O7 Catalysts" Catalysis Today, 16 (1993) 113–121, Satsuma, month not avail.
"Selective Oxidation of n–butane to maleic anhydride with vanadium phosphorus catalysts prepared by comminication in the presence of disperants" Applied Catalysis A: General 154 (1997) 103–125, Hutchings, month not avail.

* cited by examiner

*Primary Examiner*—Mark L. Bell
*Assistant Examiner*—Patricia L. Hailey
(74) *Attorney, Agent, or Firm*—Pitney Hardin LLP

(57) ABSTRACT

A novel intercalation compound is provided, in which compound monohydric alcohol is intercalated between layers of a layered compound comprising vanadium, phosphorus and oxygen as primary components, characterized in that the monohydric alcohol is aliphatic secondary monohydric alcohol, alicyclic monohydric alcohol, or aromatic monohydric alcohol. By heating the intercalation compound, a vanadium-phosphorus mixed oxide having a BET specific surface area of at least 80 m$^2$/g can be obtained.

4 Claims, 17 Drawing Sheets benzyl alcohol

Fig. 25
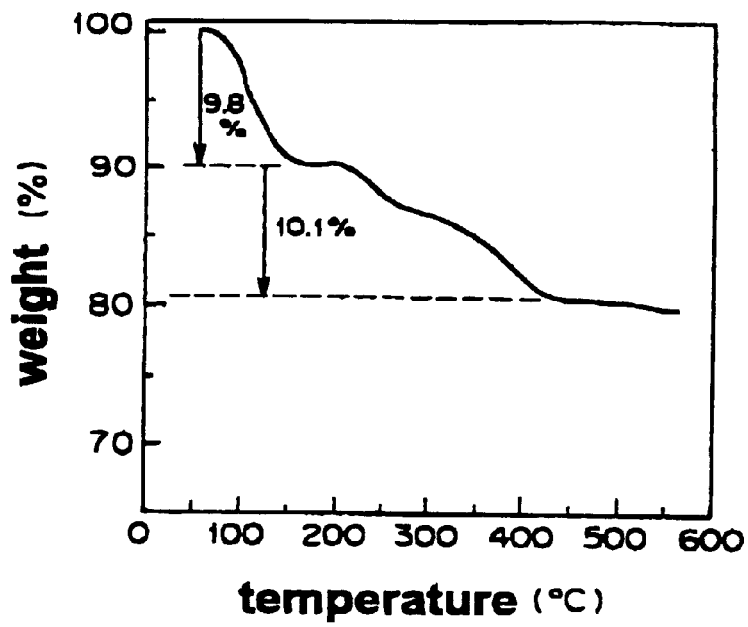
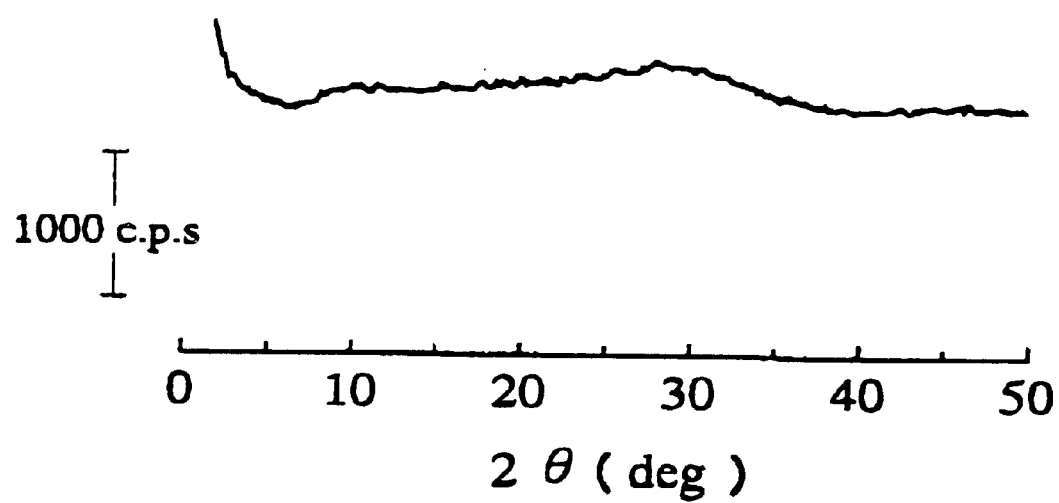
Fig. 26

VANADIUM PHOSPHOROUS MIXED OXIDE

This is a division of U.S. patent application Ser. No. 09/604,088 filed on Jun. 27, 2000, now U.S. Pat. No. 6,495,486.

FIELD OF THE INVENTION

The invention relates to an intercalation compound comprising vanadium, phosphorus and oxygen as primary components with monohydric alcohol being intercalated between layers of the compound and to a vanadium phosphorus mixed oxide as well as to processes for preparing the same.

DESCRIPTION OF THE PRIOR ART

As a layered compound comprising vanadium, phosphorus and oxygen as primary components, vanadyl phosphate, vanadyl hydrogen phosphate hemihydrate or the like is known. Here, vanadyl hydrogen phosphate hemihydrate, $VOHOP_4.0.5H_2O$, is well known as a precursor for divanadyl pyrophosphate, $[(VO)_2P_2O_7]$, which is used as a catalyst for the preparation of maleic anhydride by oxidizing butane.

It is known that an organic compound is intercalated between layers of these layered compounds to give a substance with a widened space between the layers. For example, a substance intercalated with pyridine or pyrrole is disclosed in Inorg. Chem. 21, 3820(1982) and Chem. Lett. 31(1993).

U.S. Pat. No. 4,418,003 discloses a process for the manufacture of a phosphorus vanadium catalyst suitable for use in the manufacture of maleic anhydride from butane, which process comprises reacting $P_2O_5$ in an aliphatic alcohol having 1 to 8 carbon atoms to produce mixed phosphate esters and reacting a vanadium compound with an inorganic acid in the aliphatic alcohol to prepare acidified alcohol and a vanadium ester, and using these to produce a vanadium phosphorus oxide catalyst which is dissolved in the acidified alcohol. The inter-layer space of the catalyst produced is 8.75 Å, which is larger than that of vanadyl hydrogen phosphate hemihydrate, 5.4 Å. This suggests that methanol is intercalated between the layers.

Vanadium-phosphorus mixed oxide is widely known as a catalyst or as a precursor thereof for the manufacture of maleic anhydride by oxidizing butane. Generally, vanadium-phosphorus mixed oxide is prepared by calcining vanadyl phosphate or vanadyl hydrogen phosphate hemihydrate, comprising vanadium, phosphorus and oxygen as primary components, in a nitrogen atmosphere or a reactive atmosphere comprising butane, nitrogen and oxygen at 350° C. to 700° C. The vanadium-phosphorus mixed oxide thus obtained has a relatively small surface area of from 10 to 50 $m^2/g$.

To prepare a catalyst of higher activity, some studies have been made to increase a surface area of vanadium-phosphorus mixed oxide. Catal. Today, 16, 113(1993) describes a method where vanadyl hydrogen phosphate hemihydrate is mixed with water or lower alcohol and then calcined to obtain a larger surface area of the calcined product. However, the surface area of the resultant calcined product is at most about 64 $m^2/g$. Appl. Catal. 154, 103 (1997) describes a method where vanadyl hydrogen phosphate hemihydrate is crashed to powder with a ball mill to obtain a larger surface area of the calcined product. However, the surface area of the resultant calcined product is at most about 46 $m^2/g$. In either method, the surface area of the resultant calcined product is not satisfactory for a catalyst for preparing maleic anhydride.

For producing a vanadium-phosphorus mixed oxide having meso-micropores, Chem. Mater., 7, 1429(1995) discloses a method of synthesizing a meso structure material having a hexagonal structure comprising vanadium and phosphorus by using alkyltrimethylammonium chloride as a template agent, wherein alkyl group has 12 to 16 carbon atoms. It mentions nothing about a surface area of the vanadium-phosphorus mixed oxide.

Japanese Patent Application Laid-open H8-259208 discloses an intercalation compound and a method of preparing the same, in which compound diols are intercalated between layers of a layered compound comprising vanadium, phosphorus and oxygen as primary components. There, monohydric alcohols are not intercalated As shown in its Comparative Example, isobutyl alcohol, which is a monohydric alcohol, cannot be intercalated between layers of the layered compound comprising vanadium, phosphorus and oxygen as primary components in that method.

WO 98/15353 discloses an intercalation compound and a method of preparing the same, in which compound an aliphatic primary monohydric alcohol is intercalated between layers of a layered compound comprising vanadium, phosphorus and oxygen as primary components. In the method, $V_2O_5$, $P_2O_5$ and the aliphatic primary monohydric alcohol are reacted in atmospheric pressure. The method is to intercalate an aliphatic primary monohydric alcohol, and accordingly, nothing is described about intercalation of an alicyclic monohydric alcohol or an aromatic monohydric alcohol. In the Comparative Examples, it is mentioned that secondary alcohols and tertiary alcohols cannot be intercalated. Further, an extremely long time is required to intercalate aliphatic primary monohydric alcohol. For example, in Example 1, 455 hours were required for intercalating methanol. In order to intercalate a branched aliphatic primary monohydric alcohol, it is suggested that it is necessary to use a more concentrated phosphoric acid to increase a rate of the reaction. However, by the method, a compound with a sufficient amount of intercalated branched aliphatic primary monohydric alcohol was not obtained, judging from a small intensity of the X-ray diffraction pattern showing intercalation of the branched aliphatic primary monohydric alcohol.

PURPOSE OF THE INVENTION

The purpose of the present invention is to provide a novel intercalation compound in which an aliphatic secondary monohydric alcohol, an alicyclic monohydric alcohol, or an aromatic monohydric alcohol is intercalated between the layers of a compound comprising vanadium, phosphorus and oxygen as primary components.

Another purpose of the present invention is to provide a novel method for quickly and conveniently preparing an intercalation compound in which a monohydric alcohol is intercalated between a layered compound comprising vanadium, phosphorus and oxygen as primary components.

Still another purpose of the present invention is to provide a novel vanadium-phosphorus mixed oxide having a remarkably large surface area and a method of preparing the same.

SUMMARY OF THE INVENTION

The present inventors have made intensive researches for a method of intercalating various kinds of monohydric alcohols between layers of a layered compound comprising vanadium, phosphorus and oxygen as primary components. As a result, it has been found that by reacting vanadium oxide having a valence of vanadium in a range of at least 4 to less than 5, phosphorus pentoxide and monohydric alcohol in atmospheric pressure, or by reacting vanadium oxide having a valence of vanadium in a range of at least 4 to at most 5, phosphorus pentoxide and a monohydric alcohol under pressure, the monohydric alcohol can be intercalated between layers of the layered compound comprising vanadium, phosphorus and oxygen as primary components, which cannot be attained by the method described in JPA Laid-open H8-259208 Also it has been found that aliphatic secondary monohydric alcohols, alicyclic monohydric alcohols or aromatic monohydric alcohols as well as aliphatic primary monohydric alcohols can be intercalated quickly and conveniently between layers of the layered compound comprising vanadium, phosphorus and oxygen as primary components, which cannot be attained by the method described in WO 98/15353.

Thus, the present invention is (1) an intercalation compound in which monohydric alcohol is intercalated between layers of a layered compound comprising vanadium, phosphorus and oxygen as primary components, characterized in that the monohydric alcohol is aliphatic secondary monohydric alcohol, alicyclic monohydric alcohol, or aromatic monohydric alcohol.

Preferred embodiments of the present invention are as follows.

(2) The intercalation compound described in (1) above, wherein the compound has a structure where apart or the whole of a moiety, POH, present in a layered compound, vanadyl hydrogen phosphate hemihydrate represented by (VO) (HOP) $O_3.0.5H_2O$, is replaced with a moiety, POR, of phosphoric acid ester of the aliphatic secondary monohydric alcohol, the alicyclic monohydric alcohol, or the aromatic monohydric alcohol, wherein R represents the residue of the monohydric alcohol, and a part or the whole of the $H_2O$ present in said compound is replaced with the aliphatic secondary monohydric alcohol, the alicyclic monohydric alcohol, or the aromatic monohydric alcohol.

(3) The intercalation compound described in (1) or (2) above, wherein the aliphatic secondary monohydric alcohol has 3 to 8 carbon atoms.

(4) The intercalation compound described in (1) or (2) above, wherein the aliphatic secondary monohydric alcohol is selected from the group consisting of 2-propanol, 2-butanol, 2-pentanol, 2-hexanol, 2-heptanol, and 2-octanol.

(5) The intercalation compound described in (1) or (2) above, wherein the alicyclic monohydric alcohols has 5 to 8 carbon atoms.

(6) The intercalation compound described in (1) or (2) above, wherein the alicyclic monohydric alcohols is selected from the group consisting of cyclopentanol, cyclohexanol, 4-methylcyclohexanol, 3-methylcyclopentanol, and 3-ethylcyclopentanol.

(7) The intercalation compound described in (1) or (2) above, wherein the aromatic monohydric alcohols has 7 to 12 carbon atoms.

(8) The intercalation compound described in (1) or (2) above, wherein the aromatic monohydric alcohols is selected from the group consisting of benzyl alcohol and 2-phenylethylalcohol.

(9) The intercalation compound described in any one of (1) to (4) above, wherein the inter-layer space of the intercalation compound in which aliphatic secondary monohydric alcohol is intercalated is in the range of from 10 to 15 Å.

(10) The intercalation compound described in any one of (1), (2), (5) or (6) above, wherein the inter-layer space of the intercalation compound in which alicyclic monohydric alcohol is intercalated is in the range of from 10 to 15 Å.

(11) The intercalation compound described in any one of (1), (2), (7) or (8) above, wherein the inter-layer space of the intercalation compound in which aromatic monohydric alcohol is intercalated is in the range of from 15 to 25 Å.

The aforesaid intercalation compound in which aliphatic secondary monohydric alcohol, alicyclic nonohydric alcohol, or aromatic monohydric alcohol is intercalated may be prepared by the present method described below. By the present method, aliphatic primary monohydric alcohols as well as aliphatic secondary monohydric alcohols, alicyclic monohydric alcohols or aromatic monohydric alcohols can be intercalated between layers quickly and conveniently.

Thus, the present method is (12) a method of preparing an intercalation compound in which monohydric alcohol is intercalated between layers of a layered compound comprising vanadium, phosphorus and oxygen as primary components, characterized in that vanadium oxide with a valence of vanadium in a range of from at least 4 to less than 5, phosphorus pentoxide and monohydric alcohol are reacted with one another in atmospheric pressure.

Preferred embodiments of the above invention are as follows.

(13) The method described in (12) above, wherein the valence of vanadium is 4.5.

(14) The method described in (12) or (13) above, wherein the vanadium oxide is $V_4O_9$.

(15) A method of preparing an intercalation compound in which monohydric alcohol is intercalated between layers of a layered compound comprising vanadium, phosphorus and oxygen as primary components, characterized in that vanadium compound with a valence of vanadium of 5 is reduced in alcohol or aldehyde into vanadium oxide with a valence of vanadium in a range of from at least 4 to less than 5, and the vanadium oxide is isolated, and then mixed into monohydric alcohol, to which mixture phosphorus pentoxide is added and heated.

(16) A method of preparing an intercalation compound in which monohydric alcohol is intercalated between layers of a layered compound comprising vanadium, phosphorus and oxygen as primary components, characterized in that vanadium compound with a valence of vanadium of 5 is reduced in alcohol or aldehyde into vanadium oxide with a valence of vanadium in a range of from at least 4 to less than 5, and the vanadium oxide is isolated, and then added to a reaction product of monohydric alcohol with phosphorus pentoxide and heated.

(17) A method of preparing an intercalation compound in which monohydric alcohol is intercalated between layers of a layered compound comprising vanadium, phosphorus and oxygen as primary components, characterized in that vanadium compound with a valence of vanadium of 5 is reduced in alcohol or aldehyde into vanadium oxide with a valence of vanadium in a range of from at least 4 to less than 5, to which monohydric alcohol and phosphorus pentoxide are added and heated.

(18) The method described in any one of (15) to (17) above, wherein the vanadium compound with a valence of vanadium of 5 is vanadium pentoxide.

(19) The method described in any one of (12) to (18) above, wherein the monohydric alcohol is selected from aliphatic primary monohydric alcohols having 1 to 12 carbon atoms, aliphatic secondary monohydric alcohols having 3 to 8 carbon atoms, alicyclic monohydric alcohols having 5 to 8 carbon atoms, and aromatic monohydric alcohols having 7 to 12 carbon atoms.

(20) The method described in (19) above, wherein the aliphatic primary monohydric alcohol is selected from the group consisting of methanol, ethanol, 1-propanol, 1-butanol, isobutanol, isopentanol, neopentanol, 2-methyl-1-butanol, 1-pentanol, 1-hexanol, and 1-octanol, the aliphatic secondary monohydric alcohol is selected from the group consisting of 2-propanol, 2-butanol, 2-pentanol, 2-hexanol, 2-haptanol, and 2-octanol, the alicyclic monohydric alcohol is selected from the group consisting of cyclopentanol, cyclohexanol, 4-methylcyclohexanol, 3-methylcyclopentanol, and 3-ethylcyclopentanol and the aromatic monohydric alcohol is selected from the group consisting of benzyl alcohol and 2-phenylethylalcohol.

(21) The method described in any one of (12) to (20) above, wherein the intercalation compound in which monohydric alcohol is intercalated between layers of a layered compound comprising vanadium, phosphorus and oxygen as primary components has a structure where a part or the whole of a moiety, POH, present in a layered compound, vanadyl hydrogen phosphate hemihydrate represented by (VO) (HOP)O$_3$.0.5H$_2$O, is replaced with a moiety, POR, of phosphoric acid ester of the aliphaticmonohydric alcohol, wherein R represents the residue of the aliphatic monohydric alcohol, and a part or the whole of the H$_2$O present in said layered compound is replaced with the aliphatic monohydric alcohol.

Further, the present inventors have found that, in the aforesaid present method, the intercalation compound can be prepared in a shorter time by carrying out a reaction preferably under pressure and vanadium oxide with a valance of vanadium of 5 can be used.

Thus, the present method is (22) a method of preparing an intercalation compound in which monohydric alcohol is intercalated between layers of a layered compound comprising vanadium, phosphorus and oxygen as primary components, characterized in that vanadium oxide with a valence of vanadium in a range of from at least 4 to at most 5, phosphorus pentoxide and monohydric alcohol are reacted with one another under pressure.

Preferred embodiments of the aforesaid method are as follows.

(23) The method described in (22) above, wherein the valence of vanadium is in a range of from 4 to less than 5.

(24) The method described in (22) above, wherein the valence of vanadium is 4.5.

(25) The method described in (22) above, wherein the vanadium oxide is V$_4$O$_9$.

(26) The method described in (22) above, wherein the vanadium compound with a valence of vanadium of 5 is vanadium pentoxide.

(27) The method described in any one of (22) to (26) above, wherein the monohydric alcohol is selected from aliphatic primary monohydric alcohols having 1 to 12 carbon atoms, aliphatic secondary monohydric alcohols having 3 to 8 carbon atoms, alicyclic monohydric alcohols having 5 to 8 carbon atoms, and aromatic monohydric alcohols having 7 to 12 carbon atoms.

(28) The method described in (27) above, wherein the aliphatic primary monohydric alcohol is selected from the group consisting of methanol, ethanol, 1-propanol, 1-butanol, isobutanol, isopentanol, neopentanol, 2-methyl-1-butanol, 1-pentanol, 1-hexanol, and 1-octanol, the aliphatic secondary monohydric alcohol is selected from the group consisting of 2-propanol, 2-butanol, 2-pentanol, 2-hexanol, 2-heptanol, and 2-octanol, the alicyclic monohydric alcohol is selected from the group consisting of cyclopentanol, cyclohexanol, 4-methylcyclohexanol, 3-methylcyclopentanol, and 3-ethylcyclopentanol and the aromatic monohydric alcohol is selected from the group consisting of benzyl alcohol and 2-phenylethylalcohol.

(29) The method described in any one of (22) to (28) above, wherein the intercalation compound in which monohydric alcohol is intercalated between layers of a layered compound comprising vanadium, phosphorus and oxygen as primary components has a structure where a part or the whole of a moiety, POH, present in a layered compound, vanadyl hydrogen phosphatehemihydrate represented by (VO) (HOP)O$_3$.0.5H$_2$O, is replaced with a moiety, POR, of phosphoric acid ester of the aliphaticmonohydric alcohol, wherein R represents the residue of the aliphatic monohydric alcohol, and a part or the whole of the H$_2$O present in said layered compound is replaced with the aliphatic monohydric alcohol.

(30) The method described in any one of (22) to (29) above, wherein the reaction pressure is 10 MPa or lower. and

(31) The method described in any one of (22) to (29) above, wherein the reaction pressure is in a range of 0.10 to 4 MPa The present inventors have made intensive researched for obtaining a vanadium-phosphorus mixed oxide having a large surface area. As a result, it has been surprisingly found that a vanadium-phosphorus mixed oxide having a remarkably large BET surface area of 80 m$^2$/g, which surface area could not be attained in the conventional methods, can be prepared by heating a specific intercalation compound in the predetermined conditions to accomplish the present invention.

Thus, the present invention is (32) a method of preparing a vanadium-phosphorus mixed oxide by heating an intercalation compound comprising vanadium, phosphorus and oxygen as primary components, characterized in that said intercalation compound is a layered compound comprising vanadium, phosphorus and oxygen as primary components with intercalated aliphatic monohydric alcohol having at least 3 carbon atoms, and said intercalation compound is heated at a temperature in a range of from higher than 250° C. to lower than 500° C. in an inert gas atmosphere containing oxygen in a concentration, based on the total gas volume, of from 0 to 2.0 vol %.

Preferred embodiments of the aforesaid method are as follows.

(33) The method described in (32) above, wherein the intercalation compound has a structure where a part or the whole of a moiety, POH, present in a layered compound, vanadyl hydrogen phosphate hemihydrate represented by (VO)(HOP)O$_3$.0.5H$_2$O, is replaced with a moiety, POR, of phosphoric acid ester of the aliphaticmonohydric alcohol having at least 3 carbon atoms, wherein R represents the residue of the aliphatic monohydric alcohol, and a part or the whole of the H$_2$O present in said layered compound is replaced with the aliphatic monohydric alcohol having at least 3 carbon atoms.

(34) The method described in (32) or (33) above, wherein the aliphatic monohydric alcohol has 3 to 8 carbon atoms.

(35) The method described in (34) above, wherein the aliphatic monohydric alcohol is selected from the group consisting of 1-propanol, 1-butanol, isobutanol, 1-pentanol, isopentanol, neopentanol, 2-methyl-1-butanol, 1-hexanol, 1-heptanol, 1-octanol, 2-propanol, 2-butanol, 2-pentanol, 2-hexanol, 2-heptanol, and 2-octanol.

(36) The method described in (34) above, wherein the aliphatic monohydric alcohol is selected from the group consisting of 1-propanol, 1-butanol, 1-octanol and 2-butanol.

(37) The method described in any one of (32) to (36) above, wherein a temperature at which the heating is performed is in a range of from 260° C. to 450° C.

(38) The method described in any one of (32) to (37) above, wherein the heating is performed in an inert gas atmosphere comprising oxygen in a concentration, based on the total gas volume, of from 0 to 1.5 vol %.

(39) The method described in any one of (32) to (38) above, wherein the inert gas is nitrogen.

(40) The method described in (38) above, wherein the inert gas does not contain oxygen.

The present invention is (41) a vanadium-phosphorus mixed oxide, characterized by a BET specific surface area of at least 80 m$^2$/g.

Preferred embodiments of the aforesaid invention are as follows.

(42) The mixed oxide described in (41) above, wherein a BET specific surface area is in a range of from 80 to 1,000 m$^2$/g.

(43) The mixed oxide described in (41) or (42) above, wherein a total micropore volume is at least 100 mm$^3$/g.

(44) The mixed oxide described in (41) or (42) above, wherein a total micropore volume is in a range of from 100 to 1,000 mm$^3$/g.

(45) The mixed oxide described in any one of (41) to (44) above, wherein a total volume of micropores having a radius smaller than 1 nm is at least 30 mm$^3$/g.

(46) The mixed oxide described in any one of (41) to (45) above, wherein a ratio of a total volume of micropores having a radius of from 1 to 2.3 nm to a total volume of micropores having a radius of from 1 to 100 nm is at least 50%.

(47) The mixed oxide described in any one of (41) to (45) above, wherein a ratio of a total volume of micropores having a radius of from 1 to 2.3 nm to a total volume of micropores having a radius of from 1 to 100 nm is at least 80%

BRIEF DESCRIPTION OF THE DRAWINGS

FIG. 25 is a thermogravimetric analysis chart of the intercalation compound prepared in Example 13, and FIG. 26 is a chart which shows the X-ray diffraction pattern of the oxide obtained by heat-treating the intercalation compound prepared in Example 6 at 280° C.

DESCRIPTION OF THE PREFERRED EMBODIMENTS

Figure 1:
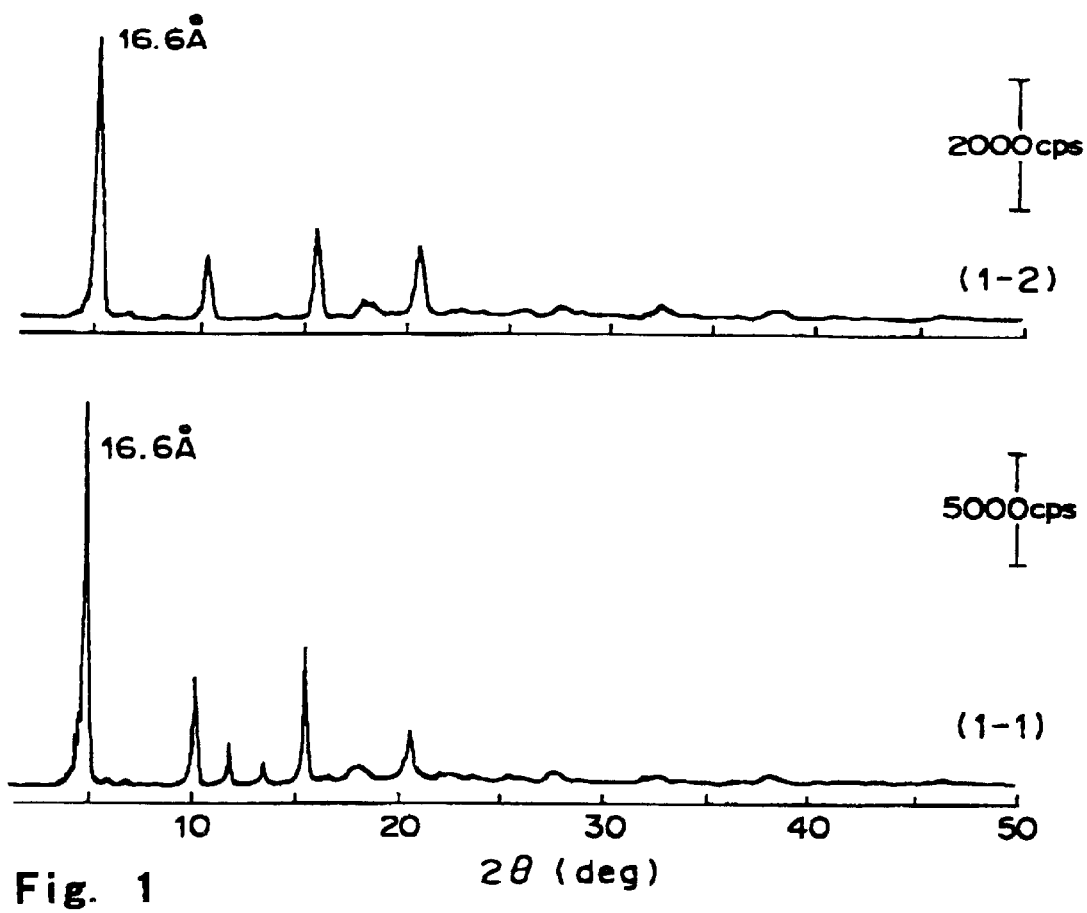
FIG. 1 is a chart which shows the X-ray diffraction patterns of the intercalation compounds prepared in Examples 1 and 2.
Figure 2:
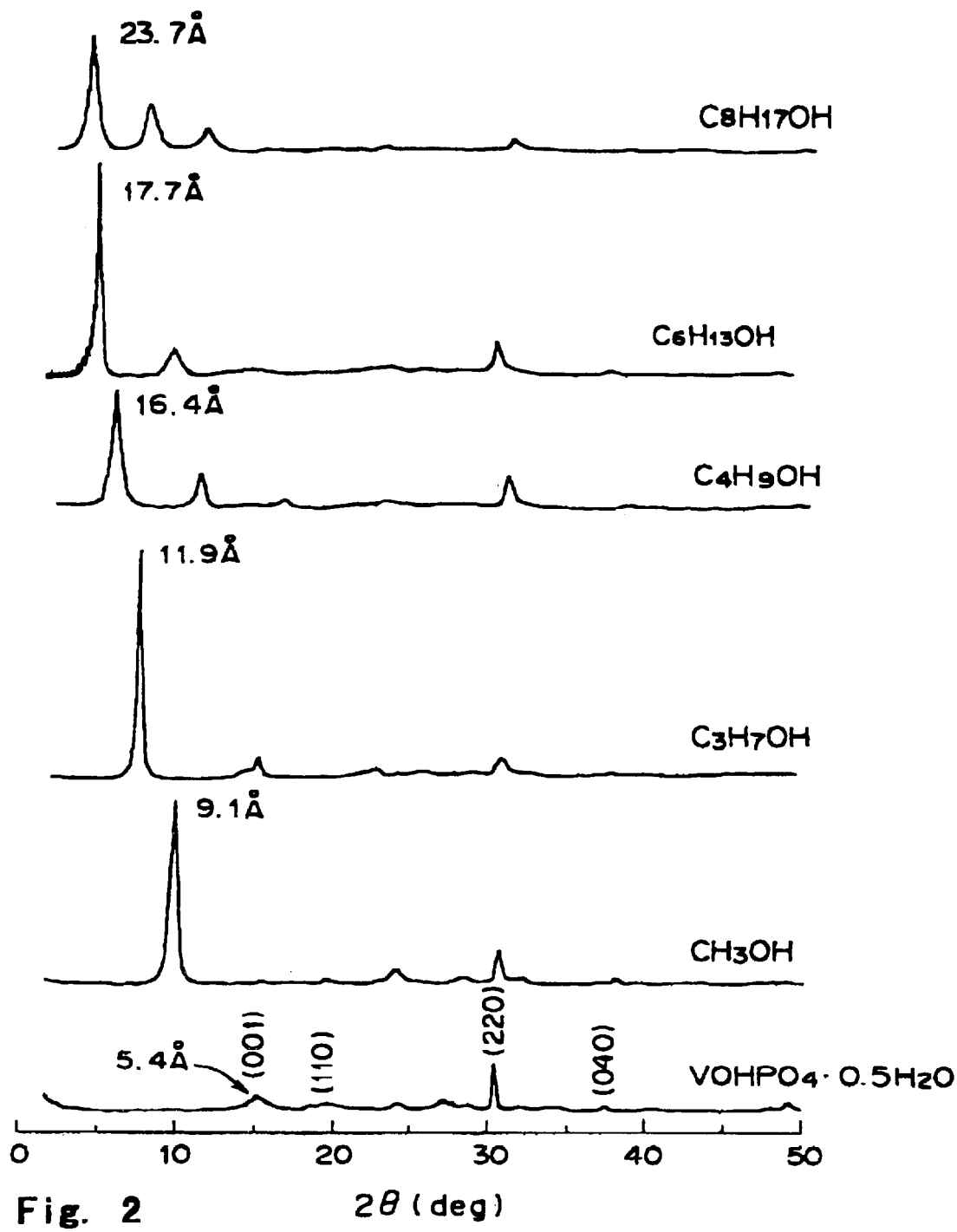
FIG. 2 is a chart which shows the X-ray diffraction patterns of the intercalation compounds prepared in Examples 4 to 8 and Comparative Example 1.
Figure 3:
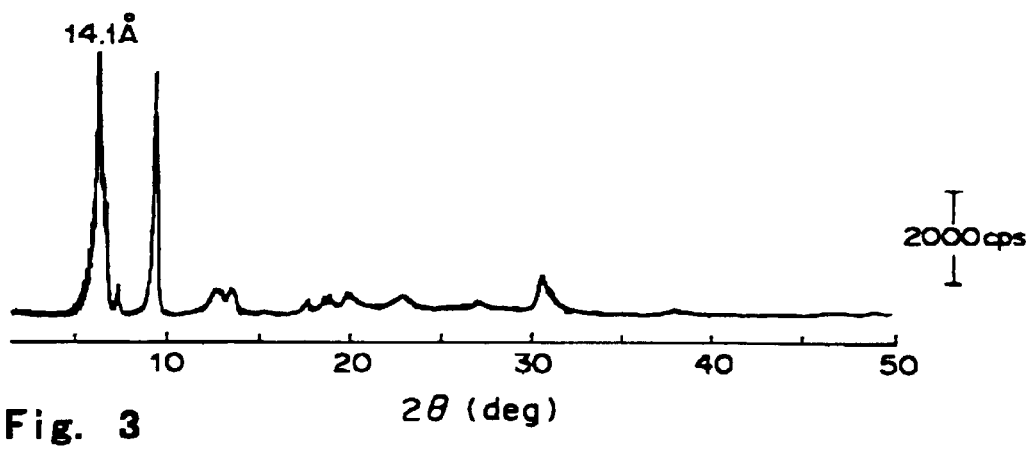
FIG. 3 is a chart which shows the X-ray diffraction pattern of the intercalation compound prepared in Examples 9.
Figure 4:
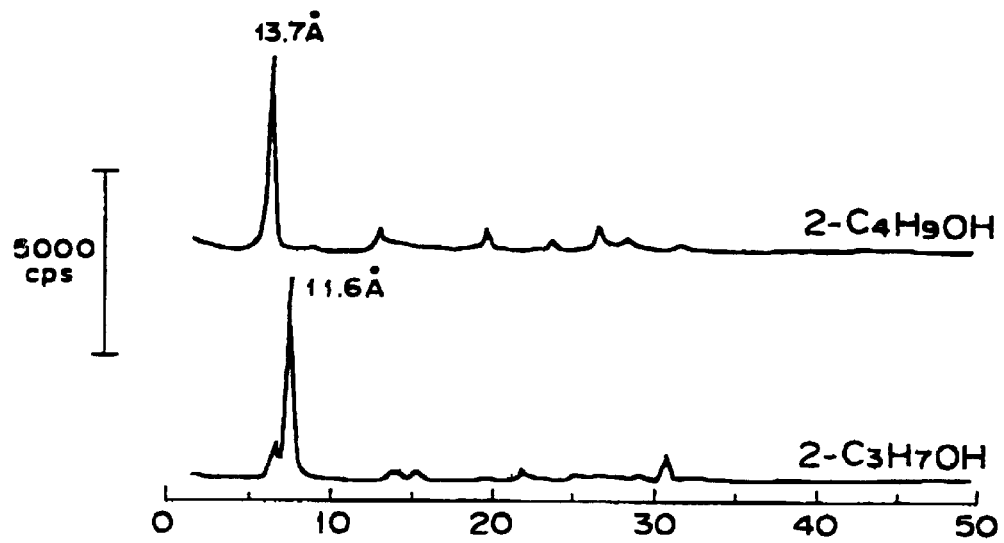
FIG. 4 is a chart which shows the X-ray diffraction patterns of the intercalation compounds prepared in Examples 10 and 11.
Figure 5:
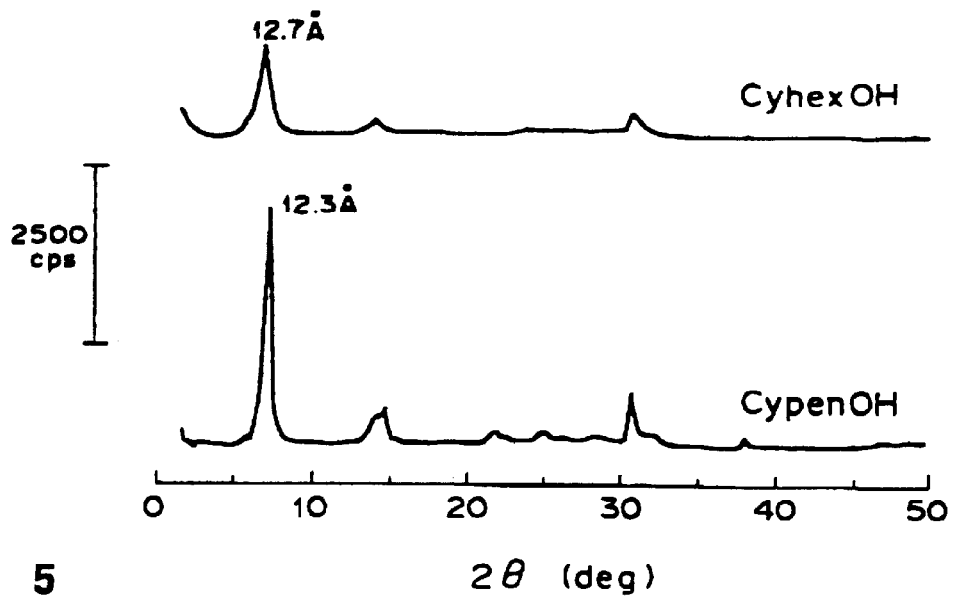
FIG. 5 is a chart which shows the X-ray diffraction patterns of the intercalation compounds prepared in Examples 12 and 13.

The vanadium oxide used in the method of preparing the present intercalation compound is, for the reaction in atmospheric pressure, one having a valence of vanadium in the range of from 4 to less than 5, preferably 4.5, and particularly $V_4O_9$; and, for the reaction under pressure, one having a valence of vanadium in the range of from at least 4 to at most 5, preferably 4 to less than 5, more preferably 4.5, particularly $V_4O_9$.

Any method can be used to prepare the vanadium oxide with the valence of vanadium in the range of from 4 to less than 5, preferably 4.5 is obtained. For example, it can be prepared by partly reducing a pentavalent vanadium compound to a valence of vanadium in a range of from 4 to less than 5, preferably 4.5. The reduction can be carried out either in a gas phase or in a liquid phase, preferably in a liquid phase. In the gas phase reduction, a reducing agent such as hydrogen, butene, butadiene, and sulfur dioxide is used. In the liquid phase reduction, an organic medium is a preferred reducing agent. Examples of the organic medium include alcohols, such as methanol, ethanol, 1-propanol, isopropanol, 1-butanol, 2-butanol, isobutanol, and benzyl alcohol; aldehydes, such as benzaldehyde, acetoaldehyde and propionaldehyde; hydrazines and oxalic acid. Alcohols, particularly isobutanol and benzyl alcohol, are preferred. Examples of the pentavalent vanadium compound include vanadium pentoxide, and ammonium vanadate. Vanadium pentoxide is preferred.

The reduction may be carried out by mixing a pentavalent vanadium compound such as vanadium pentoxide with an alcohol such as isobutanol and/or benzyl alcohol and then refluxing the mixture preferably for 0.5 to 80 hours, more preferably for 1 to 10 hours. Then the mixture is filtered, washed with a solvent having a low boiling temperature such as methanol and ethanol and dried. The compound thus prepared is identified as $V_4O_9$, based on its X-ray diffraction pattern obtained by Cu—Kα radiation.

By reacting the vanadium oxide thus obtained with a valence of vanadium in the range of from 4 to less than 5, preferably 4.5, particularly $V_4O_9$, with phosphorus pentoxide and monohydric alcohol, an intercalation compound is obtained in which the monohydric alcohol is intercalated between layers of a layered compound comprising vanadium, phosphorus and oxygen as primary components.

The monohydric alcohol to be intercalated is selected from aliphatic primary monohydric alcohols preferably having 1 to 12 carbon atoms, particularly 1 to 8 carbon atoms, aliphatic secondary monohydric alcohols preferably having 3 to 8 carbon atoms, alicyclic monohydric alcohols preferably having 5 to 8 carbon atoms, and aromatic monohydric alcohols preferably having 7 to 12 carbon atoms. Preferred examples of the aliphatic primary monohydric alcohol include methanol, ethanol, 1-propanol, 1-butanol, isobutanol, isopentanol, neopentanol, 2-methyl-1-butanol, 1-pentanol, 1-hexanol, and 1-octanol. Preferred examples of the aliphatic secondary monohydric alcohol include 2-propanol, 2-butanol, 2-pentanol, 2-hexanol, 2-heptanol, and 2-octanol. Preferred examples of the alicyclic monohydric alcohol include cyclopentanol, cyclohexanol, 4-methylcyclohexanol, 3-methylcyclopentanol, and 3-ethylcyclopentanol. Preferred examples of the aromatic monohydric alcohol include benzyl alcohol, and 2-phenylethylalcohol.

The monohydric alcohol is used preferably in an amount, per mole of vanadium, of at most 1000 moles, particularly at most 100 moles, and preferably at least 3 moles, particularly at least 5 moles. If it is used in an amount below the aforesaid lower limit, a sufficient amount of the monohydric alcohol cannot be intercalated. Phosphorus pentoxide is used preferably in an amount, expressed in an atomic ratio of phosphorus to vanadium, of at most 3, particularly at most 1.5, and at least 0.7, particularly at least 1. If it is used in an amount less than the aforesaid lower limit, a sufficient amount of the monohydric alcohol cannot be intercalated.

Exemplary methods of preparing the present intercalation compound with monohydric alcohol intercalated are as follows. Vanadium oxide with a valence of vanadium in the range of from 4 to less than 5, preferably 4.5, particularly $V_4O_9$, prepared as described above, is mixed with monohydric alcohol, to which phosphorus pentoxide is added, wherein the order of the addition of the above three substances may be altered. Then, the resultant mixture is reacted preferably under refluxing, and preferably under pressure. The resultant reaction product is filtered and washed with a solvent having a low boiling temperature such as acetone, methanol, and ethanol. Alternatively, vanadium oxide with a valence of vanadium in the range of from 4 to less than 5, preferably 4.5, particularly $V_4O_9$, is added to a reaction product of monohydric alcohol and phosphorus pentoxide, and the resultant mixture is reacted preferably under refluxing, and preferably under pressure. The resultant reaction product is filtered and washed with a solvent having a low boiling temperature such as acetone, methanol, and ethanol. In another method, vanadium compound with a valence of vanadium of 5 such as vanadium pentoxide is mixed into monohydric alcohol such as benzyl alcohol, and reduced with refluxing, to which monohydric alcohol and phosphorus pentoxide are added and reacted preferably under refluxing, and preferably under pressure. In any of the above-described methods, the reaction may be performed preferably in atmospheric pressure at a refluxing temperature of alcohol in use, and preferably under pressure. In the reaction under pressure, the pressure may be varied depending on monohydric alcohol in use, but is preferably 10 MPa or lower, more preferably 4 MPa or lower, particularly 1 MPa or lower, and higher than atmospheric pressure, more preferably 0.10 MPa or higher, particularly 0.20 MPa or higher. At a pressure lower than the aforesaid lower limit, a relatively longer time is required to intercalate monohydric alcohol, while at a pressure higher than the above higher limit, costs of equipment is higher. A temperature in the reaction under pressure may be varied depending on the species of the monohydric alcohol in use and the pressure employed, but is not limited as far as the monohydric alcohol is kept in a liquid state. The reaction temperature is preferably at least the boiling point of the monohydric alcohol in use at atmospheric pressure plus 1° C., more preferably plus 3° C., and at most the boiling point of the monohydric alcohol in use at atmospheric pressure plus 175° C., more preferably plus 135° C., particularly plus 70° C. A reaction time depends on the reaction pressure and temperature, and is preferably in the range of from 0.1 to 100 hours, more preferably 1 to 60 hours, particularly 1 to 30 hours, either in the reactions in atmospheric pressure and under pressure. If the reaction time is shorter than the aforesaid lower limit, monohydric alcohol cannot be intercalated. If it is longer than the aforesaid higher limit, a higher production costs and more complicated operations are required.

By the aforesaid present method, the present intercalation compound can be prepared, in which monohydric alcohol is intercalated between layers of a layered compound comprising vanadium, phosphorus and oxygen as primary components. The intercalation compound has a structure where a part or the whole of the moiety, POH, present in the layered compound of vanadyl hydrogen phosphate hemihydrate, $(VO)(HOP)O_3 \cdot 0.5H_2O$, is replaced with the moiety, POR, of phosphoric acid ester of the monohydric alcohols, wherein R is the monohydric alcohol residue, and a part or the whole of the $H_2O$ present in the aforesaid compound is replaced with the monohydric alcohol.

Especially, by the present method, alcohol is intercalated between layers of the layered compound comprising vanadium, phosphorus, and oxygen as primary components wherein the alcohol may be aliphatic secondary monohydric alcohols, preferably those having 3 to 8 carbon atoms, more preferably 2-propanol, 2-butanol, 2-pentanol, 2-hexanol, 2-heptanol, and 2-octanol; alicyclic monohydric alcohols, preferably those having 5 to 8 carbon atoms, more preferably cyclopentanol, cyclohexanol, 4-methylcyclohexanol, 3-methylcyclopentanol, and 3-ethylcyclopentanol; and aromatic monohydric alcohols, preferably those having 7 to 12 carbon atoms, more preferably benzyl alcohol, and 2-phenylethylalcohol.

The inter-layer space of the intercalation compound prepared by the present method is determined by the species of the intercalated monohydric alcohol and is at least 9.0 Å, preferably in the range of 9.0 to 250 Å. The inter-layer space is preferably in the range of from 10 to 15 Å in the case of an aliphatic secondary alcohol; from 10 to 15 Å in the case of an alicyclic monohydric alcohol; and from 15 to 25 Å in the case of an aromatic monohydric alcohol.

Figure 12:
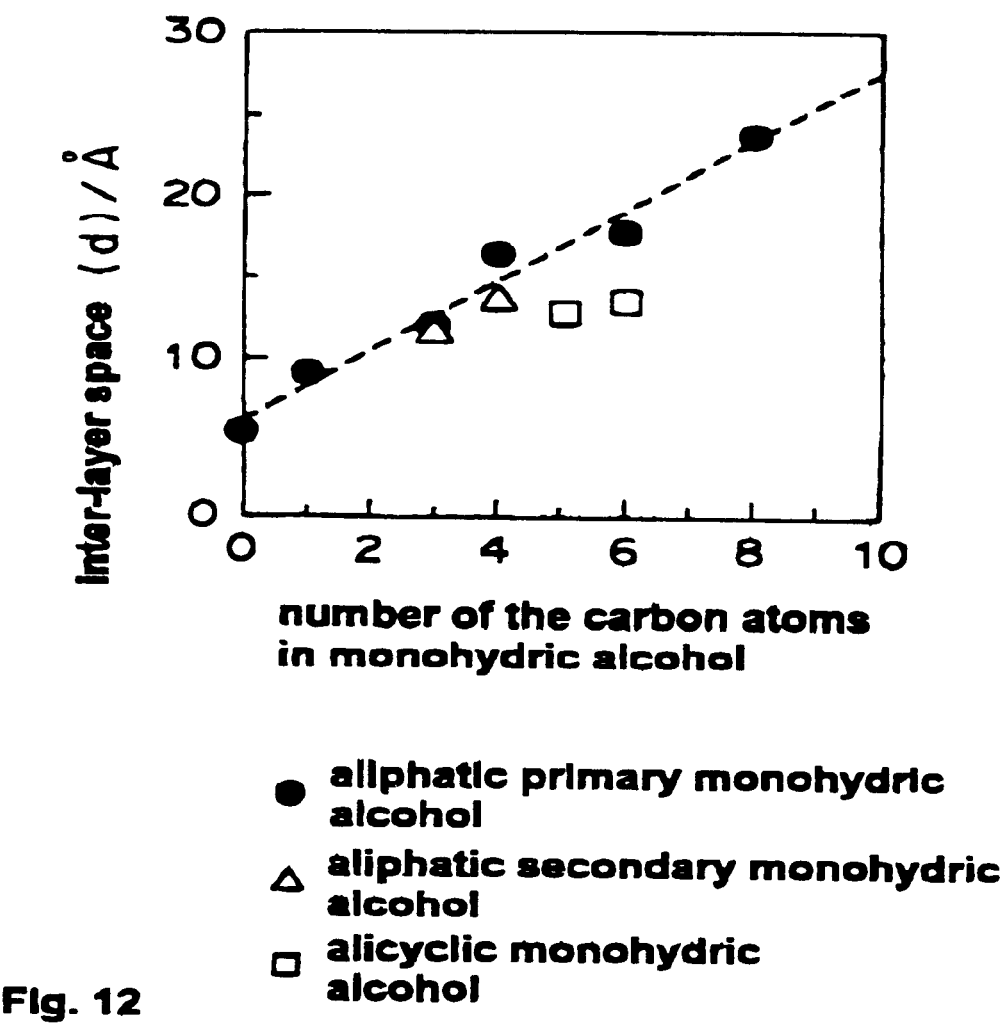
FIG. 12 is a graph which shows correlation between the carbon number of monohydric alcohol and inter-layer space in the intercalation compounds of the present invention.
Figure 13:
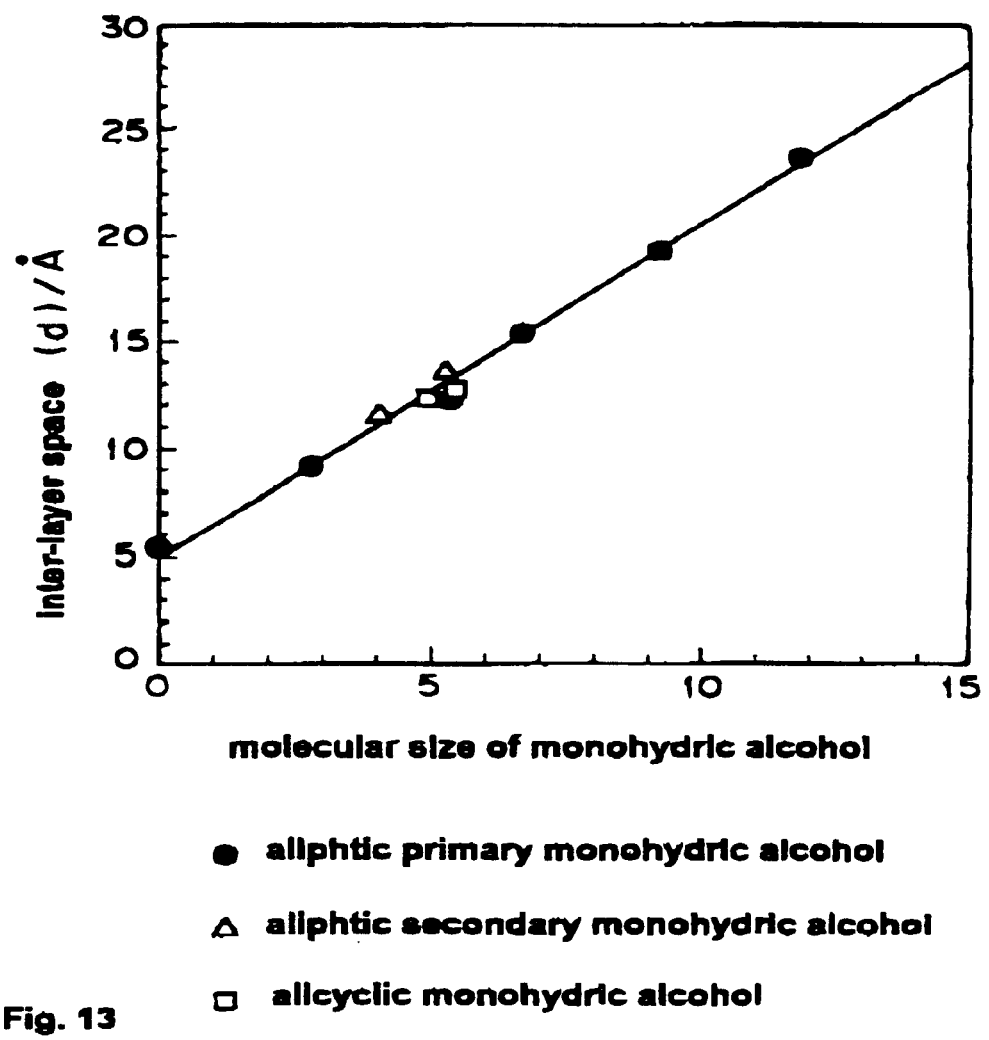
FIG. 13 is a graph which shows correlation between a size of monohydric alcohol and inter-layer space in the intercalation compounds of the present invention.

That the monohydric alcohol is intercalated between layers of the intercalation compound prepared by the present method has been confirmed by the following observations as will be detailed in the present Examples:

in an X-ray diffraction, diffraction peaks showing a widened inter-layer space are observed at 2θ of from 2 to 10° instead of the (001) diffraction peak of vanadyl hydrogen phosphate hemihydrate (see FIGS. 1 to 10);

the inter-layer space increases almost proportionally with the increasing number of carbon atom in the monohydric alcohol in use, which is seen, for example, for an aliphatic primary monohydric alcohol in FIG. 12, and the inter-layer space increases almost proportionally with the increasing size of the monohydric alcohol in use (see FIG. 13);

in an IR spectrum of the present intercalation compound in which the monohydric alcohol, i.e., methanol, 2-propanol, 2-butanol, cyclopentanol, cyclohexanol, or benzyl alcohol is intercalated, there are obsereved an absorption band attributable to a moiety, POC, which moiety is not present in vanadyl hydrogen phosphate hemihydrate, and a band attributable to free COH (see FIGS. 14 to 19);

in thermogravimetric analysis, weight loss is observed at a lower temperature, which loss is considered to be caused by evaporation of the monohydric alcohol present in the compound; and weight loss at a higher temperature, which loss is considered to be caused by combustion of the monohydric alcoholic residue of phosphoric acid ester (see FIGS. 20 to 25); and a chemical formula inferred from a result of elemental analysis agrees almost with the result of the thermogravimetric analysis.

The present intercalation compound can be used as a precursor for divanadyl pyrophosphate, $(VO)_2P_2O_7$, used as a catalyst for the preparation of maleic anhydride by oxidizing butane. Taking advantage of its wide inter-layer space, the present compound can be used as an adsorbent or a separating agent, and also as an agent for controlling a molecular weight of a polymer by polymerizing a monomer between the layers. From the present intercalation compound, a catalyst is prepared, in a similar manner as in the preparation from vanadium hydrogen phosphate hemihydrate, by calcining the compound in an atmosphere of nitrogen, air or in an atmosphere of butane oxidation reaction. If the layers of the present intercalation compound is cross linked with a silane coupling agent or polycations of aluminum before the calcination, the calcined product is a porous material having a larger inter-layer space which can be used as an adsorbent, a separating agent or a catalyst.

The present invention relates also to a method of preparing a vanadium-phosphorus mixed oxide by heating an intercalation compound in which an aliphatic monohydric alcohol having at least 3 carbon atoms is intercalated between layers of a layered compound comprising vanadium, phosphorus and oxygen as primary components. The intercalation compound in which an aliphatic monohydric alcohol having at least 3 carbon atoms is intercalated can be prepared in the above-described method.

The above-described intercalation compound preferably has a structure where a part or the whole of moiety, POH, present in a layered compound, vanadyl hydrogen phosphate hemihydrate, $(VO)(HOP)O_3 \cdot 0.5H_2O$, is replaced with a moiety, POR, which is a part of the structure of phosphric acid ester of the aliphatic monohydric alcohol having at least 3 carbon atoms, wherein R is the monohydric alcohol residue, and a part or the whole of the $H_2O$ present in the aforesaid layered compound is replaced with the aliphatic monohydric alcohol having at least 3 carbon atoms.

The intercalated aliphatic monohydric alcohol has at least 3 carbon atoms, preferably 3 to 8 carbon atoms, and preferably is an aliphatic primary monohydric alcohol or an aliphatic secondary monohydric alcohol. The preferred aliphatic primary monohydric alcohol is selected from the group consisting of 1-propanol, 1-butanol, isobutanol, 1-pentanol, isopentanol, neopentanol, 2-methyl-1-butanol, 1-hexanol, 1-heptanol, 1-octanol, 2-propanol, 2-butanol, 2-pentanol, 2-hexanol, 2-heptanol, and 2-octanol, particularly from the group consisting of 1-propanol, 1-butanol, 1-octanol and 2-butanol. If the number of the carbon atoms in the aliphatic monohydric alcohol is less than the aforesaid lower limit, a vanadium-phosphorus mixed oxide with a BET specific surface area of at least 80 $m^2/g$ cannot be prepared. With other kind of monohydric alcohol than the aliphatic monohydric alcohol, such as alicyclic monohydric alcohol and aromatic monohydric alcohol, a vanadium-phosphorus mixed oxide with a BET specific surface area of at least 80 $m^2/g$ cannot be prepared either.

In the present method, the intercalation compound in which monohydric alcohol hating at least 3 carbon atoms is intercalated is heated in an inert gas atmosphere which does not contain oxygen in a concentration, based on the total gas volume, of more than 2.0 vol %, preferably more than 1.5 vol %, more preferably more than 1.0 vol %. Examples of the inert gas include nitrogen and argon The intercalation compound is preferably heated in an inert gas such as nitrogen and argon. If an atmosphere contains more oxygen than the aforesaid higher limit, a surface area of the resultant vanadium-phosphorus mixed oxide, such as a BET specific surface area, is undesirably small.

In the present method, a temperature at which the heating of the aforesaid intercalation compound is performed to prepare the vanadium-phosphorus mixed oxide is in the range of from higher than 250° C. to lower than 500° C., preferably in the range of from 260 to 450° C. If the temperature is not in the above-mentioned range, the surface area of the resultant vanadium-phosphorus mixed oxide, such as a BET specific surface area, is undesirably small.

The heating time can be varied depending on the type of the intercalated monohydric alcohol, but is preferably in the range of from 0.3 to 100 hours, more preferably from 0.5 to 10 hours.

The BET specific surface area of the vanadium-phosphorus mixed oxide prepared in the present method is at least 80 m²/g, preferably at least 90 m²/g. A maximum BET specific surface area is preferably 1,000 m²/g, more preferably 500 m²/g. A total micropore volume of the vanadium-phosphorus mixed oxide is preferably at least 100 m³/g, more preferably at least 120 mm³/g, particularly at least 140 mm³/g. The maximum volume is preferably 1,000 mm³/g. A total volume of micropores having a radius smaller than 1 nm is preferably 30 mm³/g or larger. A ratio of a total volume of micropores having a radius of from 1 to 2.3 nm to that of micropores having a radius of from 1 to 100 nm in the vanadium-phosphorus mixed oxide is at least 50%, preferably at least 80%. In the present invention, the volume of micropores having a radius smaller than 1 nm is calculated from an $N_2$-adsorption and desorption isotherm according to a t-method(J. Colloid Sci., 21, 405(1966)). The volume and distribution of micropores having a radius of from 1 to 100 nm is calculated from an $N_2$-adsorption and desorption isotherm according to Dollimore & Heal method (J. Applied Chem. 14, 109(1964)).

The present vanadium-phosphorus mixed oxide can be used as a catalyst, a precursor for a catalyst, and a carrier for a catalyst. Especially, it can be used as a catalyst for the production of maleic acid anhydride by the oxidation of n-butane, butene, or butadiene. Further, because of its significantly large BET specific surface area and narrow distribution of micropores, it can be used as an adsorbent functioning as a molecular sieve.

The present invention will be detailed below with reference to the following Examples, but not limited by them.

EXAMPLES

Measurements were carried out as follows.

X-ray Diffraction

As an X-ray source, Cu—Kα radiation was used. The instrument used was RINT-1400, ex Rigaku Denki Co.

Infrared Spectroscopy

A sample was diluted with KBr to a concentration of 1 wt % and molded under a pressure into a disk. The measurement was carried out in a transmission mode. The instrument used was Perkin-Elmer model 1600.

Thermal Analysis

The measurement was carried out with a heating rate of 5° C./min. in an air stream in a flow rate of 100 ml/min. The instrument used was TG/DTA-200, ex Seiko Denshi Kogyo Co.

BET Specific Surface Area and Micropore Distribution Measurements

Adsorption and desorption isotherms with nitrogen were taken and micropore volume and micropore distribution were determined according to the t-method and the Dollimore & Heal method as described above, respectively. The measurement conditions were as follows:

instrument: BELSORP 28SA, ex Nihon Bel Co., pre-treatment: the sample was evacuated at a temperature lower than the heat-treatment temperature by 50° C. for 2 hours, and adsorption and desorption temperature: −196° C., boiling point of nitrogen.

Example 1

In a mixed solvent of 90 ml (0.98 mole) of isobutanol and 60 ml (0.58 mole) of benzyl alcohol, 14.55 g (0.08 mole) of vanadium pentoxide was suspended and reduced under reflux at 105° C. for 3 hours. After cooled to room temperature, the precipitates were isolated by filtering, washed with 250 ml of acetone and dried overnight at room temperature, to obtain a black solid. In 150 ml (1.45 moles) of benzyl alcohol, 12.02 g of the black solid was suspended, to which a suspension of 13.53 g (0.095 mole) of phosphorus pentoxide in 40 ml of toluene was added at room temperature under stirring. Then, the suspension was heated at 105° C. for 3 hours with stirring to cause reaction. After the suspension was cooled to room temperature, the resultant precipitates were isolated by filtering, washed with 250 ml of acetone and dried overnight at room temperature.

The valence of vanadium of the obtained solid of light blue color was 4. The inter-layer space was determined to be 16.6 Å, based on the X-ray diffraction peak at 2θ=5.3° (see, FIG. 1, 1-1).

Example 2

Vanadium pentoxide was reduced as in Example 1, to obtain a black solid. Separately, a suspension of 13.53 g (0.095 mole) of phosphorus pentoxide in 40 ml of toluene was added to 150 ml (1.45 moles) of benzyl alcohol at room temperature under stirring. The phosphorus pentoxide was dissolved completely with stirring at room temperature for 30 minutes. Then, to the solution, 12.02 g of the aforesaid black solid was added and heated at 105° C. in atmospheric pressure for 3 hours to cause reaction. After cooled to room temperature, the resultant precipitates were isolated by filtering, washed with 250 ml of acetone and dried overnight at room temperature.

The valence of vanadium of the obtained solid of light blue color was 4. The inter-layer space was determined to be 16.6 Å, based on the X-ray diffraction peak at 2θ=5.3° (see, FIG. 1, 1-2).

Example 3

In a mixed solvent of 45 ml (0.49 mole) of isobutanol and 30 ml (0.29 mole) of benzyl alcohol, 7.28 g (0.04 mole) of vanadium pentoxide was suspended and reduced at a refluxing temperature of 105° C. for 3 hours. After cooled the suspension to room temperature, a suspension of 5.65 g (0.04 mole)of phosphorus pentoxide in 15 ml of toluene was added to it at room temperature under stirring. Then, additional 15 ml (0.15 mole) of benzyl alcohol was added at room temperature with stirring. The suspension was heated at 105° C. with stirring for 3 hours to cause reaction. After cooled to room temperature, the precipitates were isolated by filtering, washed with 125 ml of acetone, and dried overnight at room temperature.

The valence of vanadium of the obtained solid of blackish gray color was 4. Similar X-ray diffraction pattern as those in Examples 1 and 2 was obtained and the inter-layer space was determined to be 16.6 Å.

Example 4

Vanadium pentoxide was reduced as in Example 1 to obtain a black solid. After that, Example 1 was repeated except that methanol was used instead of benzyl alcohol, and the refluxing was carried out for 72 hours.

The valence of vanadium of the obtained solid of light blue color was 4. The inter-layer space was determined to be 9.1 Å, based on the X-ray diffraction peak at 2θ=9.7° (see the X-ray diffraction pattern marked "CH₃OH" in FIG. 2).

Example 5

Example 4 was repeated except that 1-propanol was used instead of methanol and the refluxing was carried out at 97° C. for 18 hours. The valence of vanadium of the obtained solid of light blue color was 4. The inter-layer space was determined to be 11.9 Å, based on the X-ray diffraction peak at 2θ=7.4° (see the X-ray diffraction pattern marked "$C_3H_7OH$" in FIG. 2).

Example 6

Example 4 was repeated except that 1-butanol was used instead of methanol and the refluxing was carried out for 3 hours. The valence of vanadium of the obtained solid of light blue color was 4. The inter-layer space was determined to be 16.4 Å, based on the X-ray diffraction peak at 2θ=5.4° (see the X-ray diffraction pattern marked "$C_4H_9OH$" in FIG. 2).

Example 7

Example 4 was repeated except that 1-hexanol was used instead of methanol and the refluxing was carried out for 3 hours. The valence of vanadium of the obtained solid of light blue color was 4. The inter-layer space was determined to be 17.7 Å, based on the X-ray diffraction peak at 2θ=5.0° (see the X-ray diffraction pattern marked "$C_6H_{13}OH$" in FIG. 2).

Example 8

Example 4 was repeated except that 1-octanol was used instead of methanol and the refluxing was carried out for 3 hours. The valence of vanadium of the obtained solid of light blue color was 4. The inter-layer space was determined to be 23.7 Å, based on the X-ray diffraction peak at 2θ=3.7° (see the X-ray diffraction pattern marked "$C_8H_{17}OH$" in FIG. 2).

Example 9

Example 4 was repeated except that isobutanol was used instead of methanol and the refluxing was carried out by for 24 hours. The valence of vanadium of the obtained solid of light blue color was 4. The inter-layer space was determined to be 14.1 Å, based on the X-ray diffraction peak at 2θ=6.3° (see FIG. 3).

Example 10

Vanadium pentoxide was reduced as in Example 1 to obtain a black solid. After that, Example 1 was repeated except that 2-propanol was used instead of benzyl alcohol and the refluxing was carried out at 81° C. for 53 hours.

The valence of vanadium of the obtained solid of light blue color was 4. The inter-layer space was determined to be 11.6 Å, based on the X-ray diffraction peak at 2θ=7.6° (see the X-ray diffraction pattern marked "$2-C_3H_7OH$" in FIG. 4).

Example 11

Example 10 was repeated except that 2-butanol was used instead of 2-propanol and the refluxing was carried out at 92° C. for 51 hours.

The valence of vanadium of the obtained gray solid was 4. The inter-layer space was determined to be 13.7 Å, based on the X-ray diffraction peak at 2θ=6.4° (see the X-ray diffraction pattern marked "$2-C_4H_9OH$" in FIG. 4).

Example 12

Vanadium pentoxide was reduced as in Example 1 to obtain a black solid. After that, Example 1 was repeated except that cyclohexanol was used instead of benzyl alcohol, and the refluxing was carried out at 115° C. for 72.5 hours.

The valence of vanadium of the obtained solid of light blue color was 4. The inter-layer space was determined to be 12.7 Å, based on the X-ray diffraction peak at 2θ=7.0° (see the X-ray diffraction pattern marked "CyhexOH" in FIG. 5).

Example 13

Example 12 was repeated except that cyclopentanol was used instead of cyclohexanol and the refluxing was carried out at 111° C. for 28 hours.

The valence of vanadium of the obtained solid of light blue color was 4. The inter-layer space was determined to be 12.3 Å based on the X-ray diffraction peak at 2θ=7.2° (see the X-ray diffraction pattern marked "CypenOH" in FIG. 5).

Example 14

Vanadium pentoxide was reduced as in Example 1 to obtain a black solid. After that, Example 1 was repeated except that ethanol was used instead of benzyl alcohol and the refluxing was carried out for 32 hours.

The valence of vanadium of the obtained solid of light blue color was 4. The inter-layer space was determined to be 10.4 Å, based on the X-ray diffraction peak at 2θ=8.5°.

Example 15

In a mixed solvent of 90 ml (0.98 mole) of isobutanol and 60 ml (0 58 mole) of benzyl alcohol, 14.55 g (0.08 mole) of vanadium pentoxide was suspended and reduced at a refluxing temperature of 105° C. for 3 hours. After cooled to room temperature, the precipitates were isolated by filtering, washed with 100 ml of acetone and dried overnight at room temperature to obtain a black solid. In 150 ml of methanol, 12.02 g of the black solid was suspended, to which a suspension of 13.53 g (0.095 mole) of phosphorus pentoxide in 40 ml of toluene was added at room temperature under stirring. The obtained suspension was transferred to a 0.5-liter stainless steel autoclave equipped with a stirrer. With the autoclave being sealed, reaction was performed by heating at 120° C. for 4 hours with stirring. The pressure during the reaction was 0.67 MPa. After cooled to room temperature, a part of the solution was taken out. The solution was filtered and washed with a little amount of acetone. After drying overnight at room temperature, a small amount of solid of light blue color was obtained. After the sample was taken out as mentioned, the autoclave was closed again and reaction was further performed by heating at 120° C. for 6 hours with stirring. The pressure in the reaction was 0.67 MPa as before. After cooled to room temperature, the solution was drained. The solution was filtered and washed with 100 ml of acetone. After drying overnight at room temperature, a solid of light blue color was obtained.

The valences of vanadium of the obtained solids of light blue color were both 4. The inter-layer space was determined to be 9.1 Å, based on the X-ray diffraction peak at 2θ=9.7° (see the X-ray diffraction patterns marked "Example 15, 4 hrs." and "Example 15, 10 hrs." in FIG. 6).

Example 16

Vanadium pentoxide was reduced as in Example 15 to obtain a black solid. In 150 ml of 1-propanol, 12.02 g of the black solid was suspended, to which a suspension of 13.53 g (0.095 mole) of phosphorus pentoxide in 40 ml of toluene was added at room temperature with stirring. The obtained suspension was transferred to a 0.5-liter stainless steel autoclave equipped with a stirrer The autoclave was closed and the content was heated at 120° C. for 4 hours with stirring to cause raction. The pressure during the reaction was 0.25 MPa. After cooled to room temperature, the solution was drained. The solution was filtered, washed with 100 ml of acetone and dried overnight at room temperature to obtain a solid of light blue color.

The valence of vanadium of the obtained solid of light blue color was 4. The inter-layer space was determined to be 11.9 Å, based on the X-ray diffraction peak at 2θ=7.4° (see the X-ray diffraction pattern marked "pressurized" in FIG. 7, top).

Example 17

Vanadium pentoxide was reduced as in Example 16 to obtain a black solid. Then, Example 16 was repeated except that 2-propanol was used instead of 1-propanol and the refluxing was performed at 120° C. for 7 hours. The pressure during the reaction was 0.54 MPa.

The valence of vanadium of the obtained solid of light blue color was 4. The inter-layer space was determined to be 11.6 Å, based on the X-ray diffraction peak at 2θ=7.6° (see the X-ray diffraction pattern marked "pressurized" in FIG. 8, top).

Example 18

Vanadium pentoxide was reduced as in Example 16 to obtain a black solid. Then, Example 16 was repeated except that 2-butanol was used instead of 1-propanol and the refluxing was performed at 100° C. for 24 hours. The pressure during the reaction was 0.60 MPa.

The valence of vanadium of the obtained gray solid was 4. The inter-layer space was determined to be 13.7 Å, based on the X-ray diffraction peak at 2θ=6.4° (see the X-ray diffraction pattern marked "pressurized" in FIG. 9, top).

Example 19

Vanadium pentoxide was reduced as in Example 16 to obtain a black solid. Then, Example 16 was repeated except that cyclopentanol was used instead of 1-propanol and the refluxing was performed at 120° C. for 4 hours. The pressure during the reaction was 0.52 MPa.

The valence of vanadium of the obtained gray solid was 4. The inter-layer space was determined to be 12.3 Å, based on the X-ray diffraction peak at 2θ=7.2° (see FIG. 10, top, "pressurized").

Example 20

Vanadium pentoxide was reduced as in Example 15 to obtain a black solid. In 150 ml of methanol, 12.02 g of the black solid was suspended, to which a suspension of 13.53 g (0.095 mole) of phosphorus pentoxide in 40 ml of toluene was added at room temperature with stirring. Then, the suspension was heated at 65° C. for 98 hours at atmospheric pressure with stirring. After cooled to room temperature, the precipitates were isolated by filtering, washed with 250 ml of acetone and dried overnight at room temperature. During the aforesaid process, parts of the solution were taken out at 24 hours, 48 hours, 60 hours, 71 hours and 80 hours after the start of the heating. Each of the sample solutions was filtered and washed with a small amount of acetone. After drying overnight at room temperature, a small amount of a solid of light blue color was obtained.

Examples 1 to 3 are different with one another in the order of the production steps. In every Examples, benzyl alcohol, i.e., aromatic monohydric alcohol, was found to be intercalated between the layers. In Examples 4, 5, 6, 7 and 8, methanol, 1-propanol, 1-butanol, 1-hexanaol, and 1-octanol, which are primary aliphatic monohydric alcohols, were used as monohydric alcohol, respectively. The inter-layer space was found to increase proportionally with the increasing number of carbon atoms in the monohydric alcohol (see FIG. 12). In Example 9, isobutanol, which is a branched aliphatic primary monohydric alcohol, was used. Comparing with the compound obtained with 1-butanol in Example 6, a compound having a smaller inter-layer space was obtained. In Examples 10 and 11, 2-propanol and 2-butanol, which are secondary aliphatic monohydric alcohols, were used, respectively. Comparing with the compounds obtained with 1-propanol and 1-butanol in Examples 5 and 6, respectively, compounds having a smaller inter-layer space were obtained. In Examples 12 and 13, cyclohexanol and cyclopentanol, which are alicyclic monohydric alcohols, were used, respectively. In both of the Examples, compounds having a smaller inter-layer Space were obtained, compared with those obtained from primary aliphatic[]monohydric alcohols having the same number of carbons.

Figure 6:
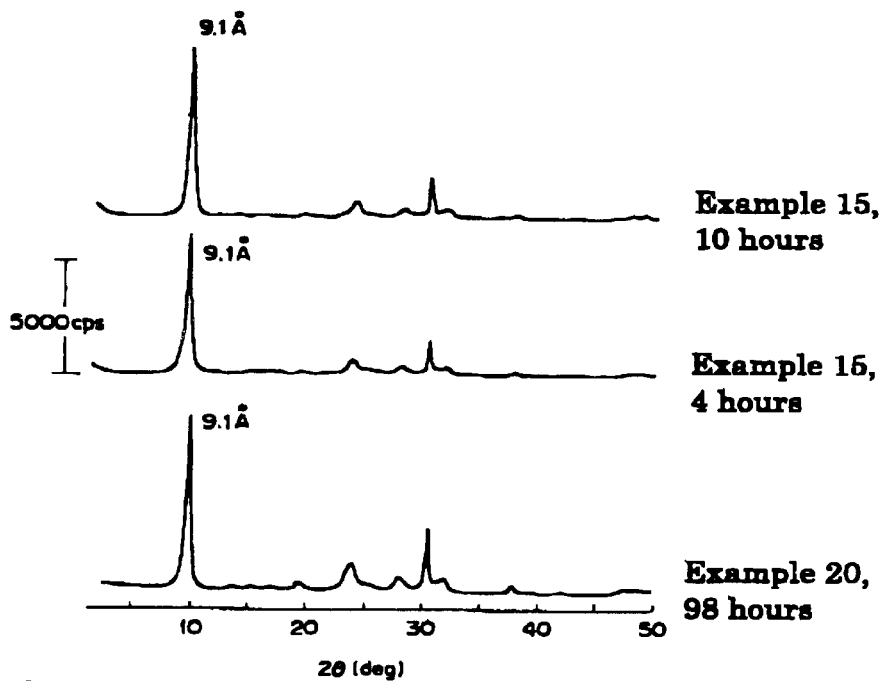
FIG. 6 is a chart which shows the X-ray diffraction patterns of the intercalation compounds prepared in Examples 15 and 20.
Figure 11:
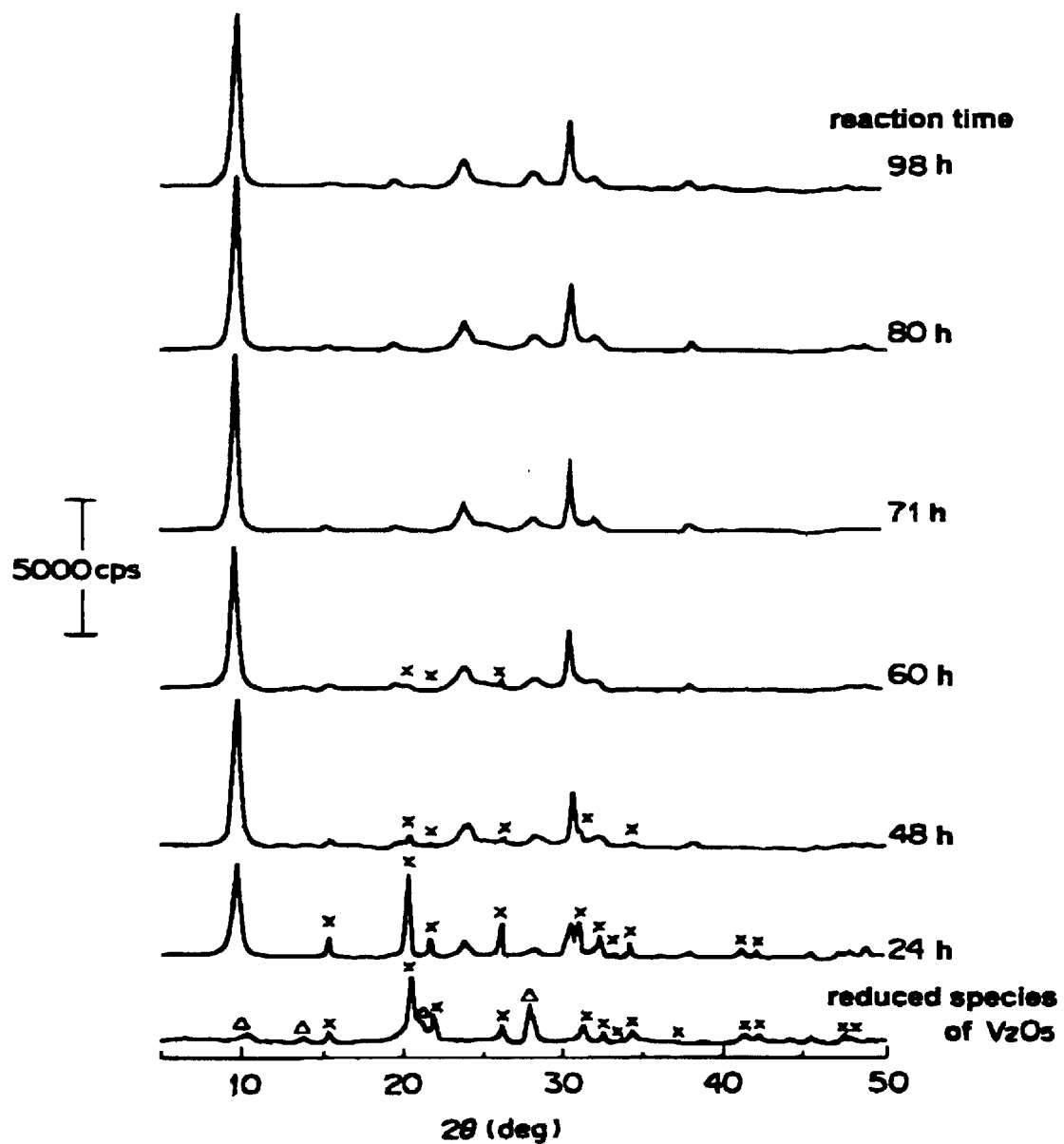
FIG. 11 is a chart which shows the X-ray diffraction patterns of the solids or black solids, i.e., reduced species of $V_2O_5$, prepared in Example 20.

FIG. 11 shows the X-ray diffraction patterns of each of the solids prepared in Example 20 and the black solid prepared by reducing vanadium pentoxide used in the reaction, i.e, a reduced species of $V_2O_5$. In FIG. 11, the peaks marked "x", assigned to $V_2O_5$, and those with Δ, assigned to $V_4O_9$, are unique to the black solid prepared by reducing vanadium pentoxide used in the reaction. As the reaction time increased, intensities of those unique peaks got weaker. At the reaction time of 71 hours or more, those peaks disappeared and only the peaks unique to the obtained intercalation compound were observed. From this, it was found that about at least 71 hours of reaction time is required to prepare an intercalation compound with methanol in atmospheric pressure. In FIG. 6, the X-ray diffraction patterns of the intercalation compound prepared in the 98 hours reaction in Example 20 are shown together with those of the intercalation compounds obtained at various reaction time in Example 15. The compound prepared in the 4 hours reaction under pressure showed the same X-ray diffraction pattern as that of the compound prepared in the 98 hours reaction in Example 20. That is, both compounds were found identical. Thus, by carrying out the reaction under pressure, the reaction temperature can be raised to thereby obtain the desired intercalation compound in a shorter reaction time.

Figure 7:
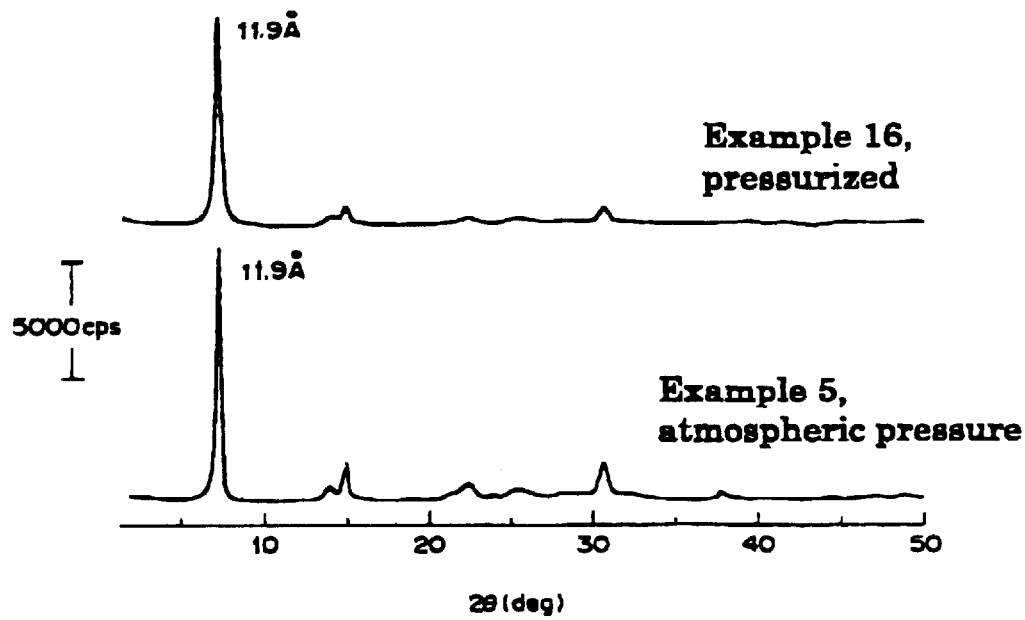
FIG. 7 is a chart which shows the X-ray diffraction patterns of the intercalation compounds prepared in Examples 16 and 5.

In FIG. 7 the X-ray diffraction pattern of the intercalation compound prepared with 1-propanol under pressure in Example 16 is shown together with the pattern of the one prepared with 1-propanol in atmospheric pressure in Example 5. The X-ray diffraction patterns were identical, which means that the compounds were identical. The reaction time under pressure was 4 hours, which was shorter than the 18 hours required for the reaction in atmospheric pressure.

Figure 8:
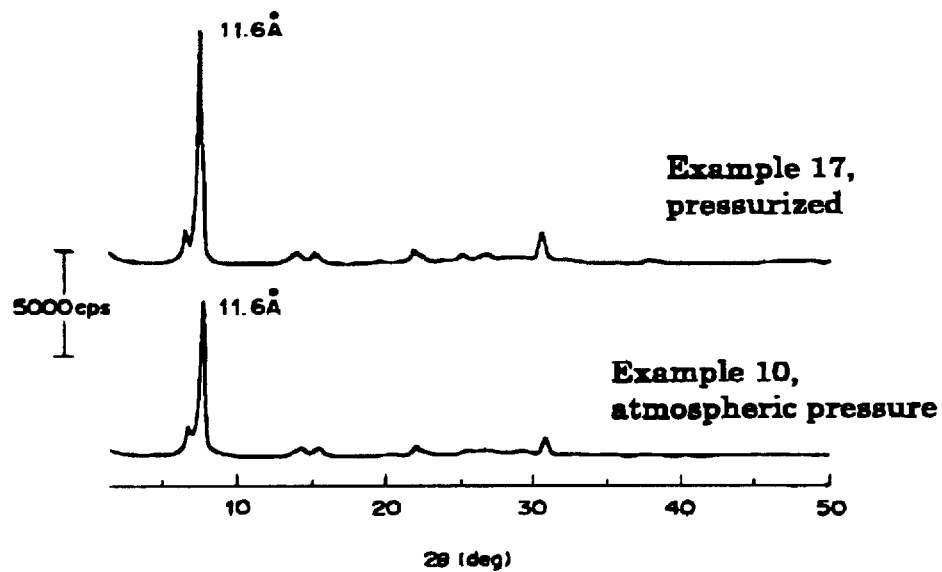
FIG. 8 is a chart which shows the X-ray diffraction patterns of the intercalation compounds prepared in Examples 17 and 10.
Figure 9:
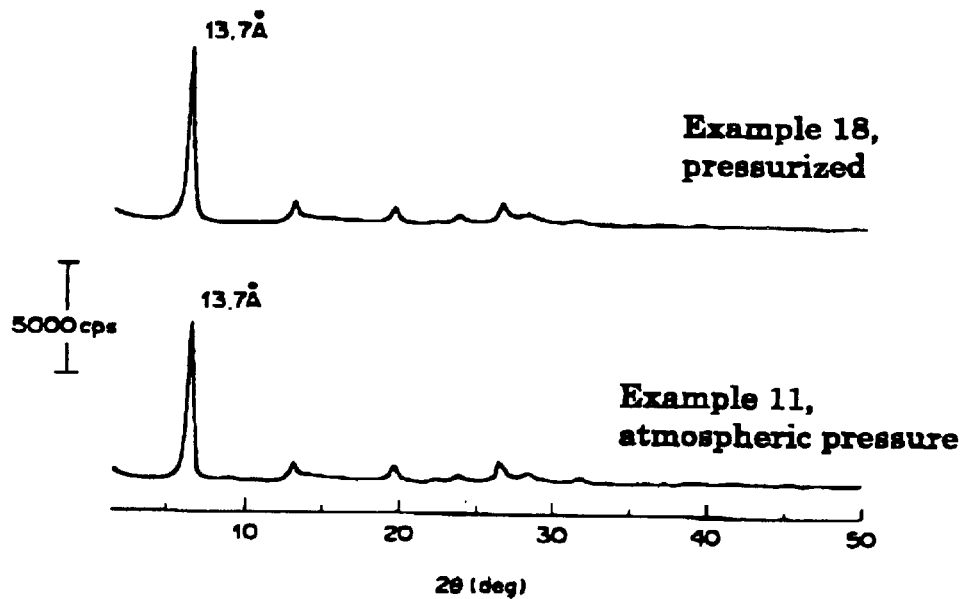
FIG. 9 is a chart which shows the X-ray diffraction patterns of the intercalation compounds prepared in Examples 18 and 11.

In FIG. 8 the X-ray diffraction pattern of the intercalation compound prepared with 2-propanol under pressure in Example 17 is shown together with the pattern of the one prepared with 2-propanol in atmospheric pressure in Example 10. The X-ray diffraction patterns were identical, which means that the compounds were identical. The reaction time under pressure was 7 hours, which was shorter than the 53 hours required for the reaction in atmospheric pressure. In FIG. 9 the X-ray diffraction patterns of the intercalation compound prepared with 2-butanol under pressure in Example 18 is shown together with the one prepared with 2-butanol in atmospheric pressure in Example 11. The X-ray diffraction patterns were identical, which means that the compounds were identical. The reaction time under pressure was 24 hours, which was shorter than the 51 hours required for the reaction in atmospheric pressure.

Figure 10:
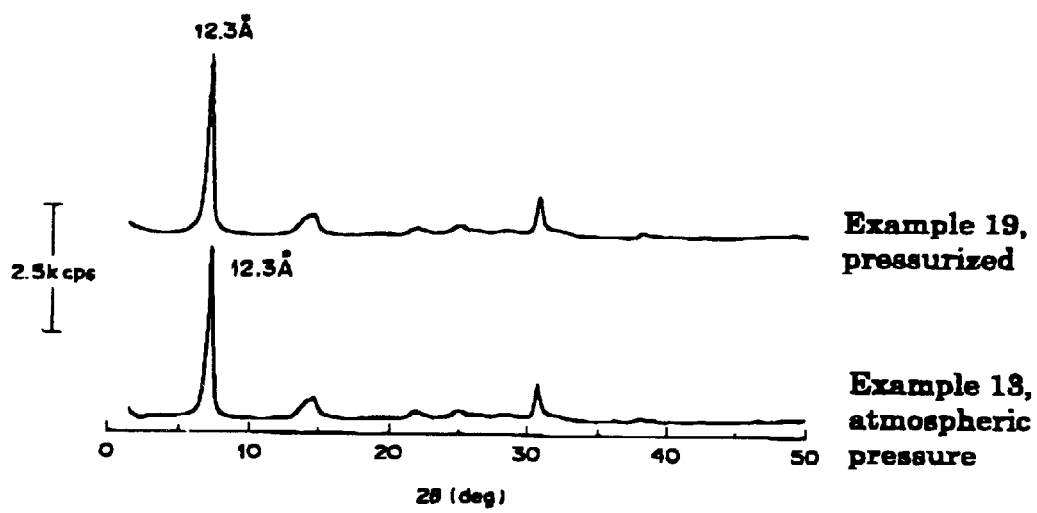
FIG. 10 is a chart which shows the X-ray diffraction patterns of the intercalation compounds prepared in Examples 19 and 13.

In FIG. 10 the X-ray diffraction pattern of the intercalation compound prepared with cyclopentanol under pressure in Example 19 is shown together with the pattern of the one prepared with cyclopentanol in atmospheric pressure in Example 13. The X-ray diffraction patterns were identical, which means that the compounds were identical. The reaction time under pressure was 4 hours, which was shorter than the 28 hours required for the reaction in atmospheric pressure. As seen above, it is preferred to conduct the reaction under pressure, so that the present intercalation compound is prepared in a shorter time.

Comparative Example 1

In a mixed solvent of 90 ml (0.98 mole) of isobutanol and 60 ml (0.58 mole)of benzyl alcohol, 14.55 g (0.08 mole) of vanadium pentoxide was suspended and reduced under reflux at 105° C. for 3 hours and cooled to room temperature. To the suspension, 15.8 g (0.16 millimole) of 99% $H_3PO_4$ was added over 30 minutes with stirring. Then, the suspension was heated under reflux at 105° C. for 3 hours to cause reaction. After the suspension was cooled to room temperature, the precipitates were isolated by filtering, washed with 250 ml of acetone and dried overnight at room temperature.

The valence of vanadium of the obtained solid of light blue color was 4. From the X-ray diffraction pattern, the precipitates were identified as $VOHOP_4.0.5H_2O$, and its inter-layer space was determined to be 5.4 Å, based on the X-ray diffraction peak at $2\theta=15.8°$ (see FIG. 2, $VOHOP_4.0.5H_2O$).

Comparative Example 2

Vanadium pentoxide was reduced as in Example 1 to obtain a black solid. In 150 ml (1.45 moles) of benzyl alcohol, 12.02 g of the black solid was suspended, and 15.8 g (0.16 millimole) of 99% $H_3PO_4$ was added over 30 minutes with stirring. Then, the suspension was heated at 105° C. for 3 hours with stirring to cause reaction. After the suspension was cooled to room temperature, the resultant precipitates were isolated by filtering, washed with 250 ml of acetone and dried overnight at room temperature.

The valence of vanadium of the obtained solid of light blue color was 4. The X-ray diffraction pattern was identical with that of the compound prepared in Comparative Example 1, which shows that the precipitates were $VOHOP_4.0.5H_2O$. No diffraction peak was observed at $2\theta=10°$ or smaller, which indicates that benzyl alcohol was not intercalated between the layers.

Comparative Example 3

Comparative Example 2 was repeated except that 2-propanol was used instead of benzyl alcohol, and the time of refluxing was 10 hours.

As in Comparative Example 2, no intercalation of 2-propanol was observed.

Comparative Example 4

Comparative Example 2 was repeated except that 2-butanol was used instead of benzyl alcohol, and the time of refluxing was 5 hours.

As in Comparative Example 2, no intercalation of 2-butanol was observed.

Comparative Example 5

Comparative Example 2 was repeated except that cyclohexanol was used instead of benzyl alcohol, and the time of refluxing was 10 hours.

As in Comparative Example 2, no intercalation of cyclohexanol was observed

Comparative Example 6

Comparative Example 2 was repeated except that cyclopentanol was used instead of benzyl alcohol, and the time of refluxing was 10 hours As in Comparative Example 2, no intercalation of cyclopentanol was observed.

Comparative Example 7

8.858 g (0.049 mole) of vanadium pentoxide, 8.35 g (0.059 mole) of phosphorus pentoxide and 200 ml of methanol were heated at 64° C. for 72 hours. After cooling the suspension to room temperature, the precipitates were isolated by filtering, washed with 250 ml of acetone, and dried overnight at room temperature.

From X-ray diffraction analysis, the precipitates were found to consist mainly of $V_2O_5$, which means that the compound with intercalated methanol was little produced.

Comparative Example 8

Comparative Example 7 was repeated except that cyclohexanol was used instead of methanol.

In X-ray diffraction analysis, $VOHOP_4.0.5H_2O$ was detected. However, the intensity of the diffraction peak was very small In addition, a very broad diffraction peak showing an amorphous phase was observed in the range around from $2\theta=10°$ to $2\theta=30°$. Accordingly, the precipitates were amorphous, and a compound with intercalated cyclohexanol was not produced at all.

Even when the heating was prolonged to 400 hours, no compound with intercalated cyclohexanol was obtained.

The present compounds with intercalated monohydric alcohol prepared in Examples 1 to 20 had significantly wider inter-layer space compared with the layered compound, $VOHOP_4.0.5H_2O$, in Comparative Example 1. In Comparative Examples 2 to 6, the reaction was performed according to the method described in Japanese Patent Application Laid-open H8-259208. From these Comparative Examples, it was found that benzyl alcohol, 2-propanol, 2-butanol, cyclohexanol and cyclopentanol cannot be intercalated between layers by heating them together with phosphoric acid ( $H_3PO_4$) and the black solid prepared by reducing vanadium pentoxide. In Comparative Example 7, the reaction was performed according to Example 1 described in WO 98/15353, except that the reaction time was reduced from 455 hours to 72 hours, as in the above-described Example 4. By the method described in WO 98/15353, a compound with intercalated methanol can little be produced in the short time. That is, a much longer reaction time is required to intercalate monohydric alcohol between the layers by that method. In Comparative Example 8, the reactions were performed according to Example 1 described in WO 98/15353, except that cyclohexanol was used and the reaction time was 72 hours as in Comparative Example 7 or 400 hours which is close to that in Example 1 described in WO 98/15353. By that method, cyclohexanol cannot be intercalated between the layers in the short time and even in the extended period of reaction time.

Next, the structure of the present intercalation compound was examined.

FIG. 12 shows that relation between the number of carbons of aliphatic primary monohydric alcohol, aliphatic secondary monohydric alcohol, and alicyclic monohydric alcohol versus the inter-layer space of the compounds with those intercalated alcohols All of the inter-layer space of the present intercalation compounds are larger than that of $VOHOP_4.0.5H_2O$, 5.4 Å. The inter-layer space increases proportionally with the increasing number of carbon atoms in each series of the aliphatic primary monohydric alcohol, the aliphatic secondary monohydric alcohol, or the alicyclic monohydric alcohol. It is believed that this is because each monohydric alcohol is intercalated between the layers.

In the aliphatic primary monohydric alcohol, the inter-layer space increases by about 2.1 to 2.2 Å as the number of carbon atoms increases by one. Considering that the length of a C—C bond is about 1.4 Å, it is believed that the alcohol molecules exist in a form of two lines between the layers of the present intercalation compound. As can be seen by comparing the X-ray diffraction pattern of $VOHOP_4.0.5H_2O$ and those of the compounds with the intercalated aliphatic primary monohydric alcohols in FIG. 2, their diffraction lines at (110), (220) and (040) are observed almost at the same position and, therefore, the two-dimensional structure in the x,y-directions of the layers was considered identical with one another. This applys also to the aliphatic secondary monohydric alcohols, the alicyclic monohydric alcohols, and aromatic monohydric alcohols.

In FIG. 12, the inter-layer space of the compound with the intercalated secondary monohydric alcohol, i.e., 2-propanol or 2-butanol, is smaller than that of the compound with the intercalated aliphatic primary monohydric alcohol of the same number of carbon atoms and is closer rather to that of the compound with the intercalated aliphatic primary monohydric alcohol of the number of carbon atoms smaller by 1, i.e., ethanol, or 1-propanol, respectively. This suggests that the inter-layer space is determined dominantly by the number of carbon atoms of the longer chain among the branched aliphatic chains in the aliphatic secondary monohydric alcohol. For the alicyclic monohydric alcohol, the inter-layer space is even smaller than that of the aliphatic primary monohydric alcohol of the same number of carbon atoms, which is considerably because the molecular size of the alicyclic alcohol is small on account of its cyclic structure.

FIG. 13 shows relation of the molecular sizes of the aliphatic primary monohydric alcohols, the aliphatic secondary monohydric alcohols, and the alicyclic monohydric alcohols versus the inter-layer space of the compounds with those intercalated alcohols. Here, the molecular size is the distance from the hydrogen atom of the OH group of the alcohol molecule to the hydrogen atom farthest from the aforesaid hydrogen atom in a structure simulated by a semi-empirical molecular orbital method (a program package, MOPAC 93). It was found that there is linear relation between the molecular size and the inter-layer space among these alcohols. Therefore, it is inferred that the inter-layer space depends on the molecular size of the intercalated monohydric alcohol.

Figure 14:
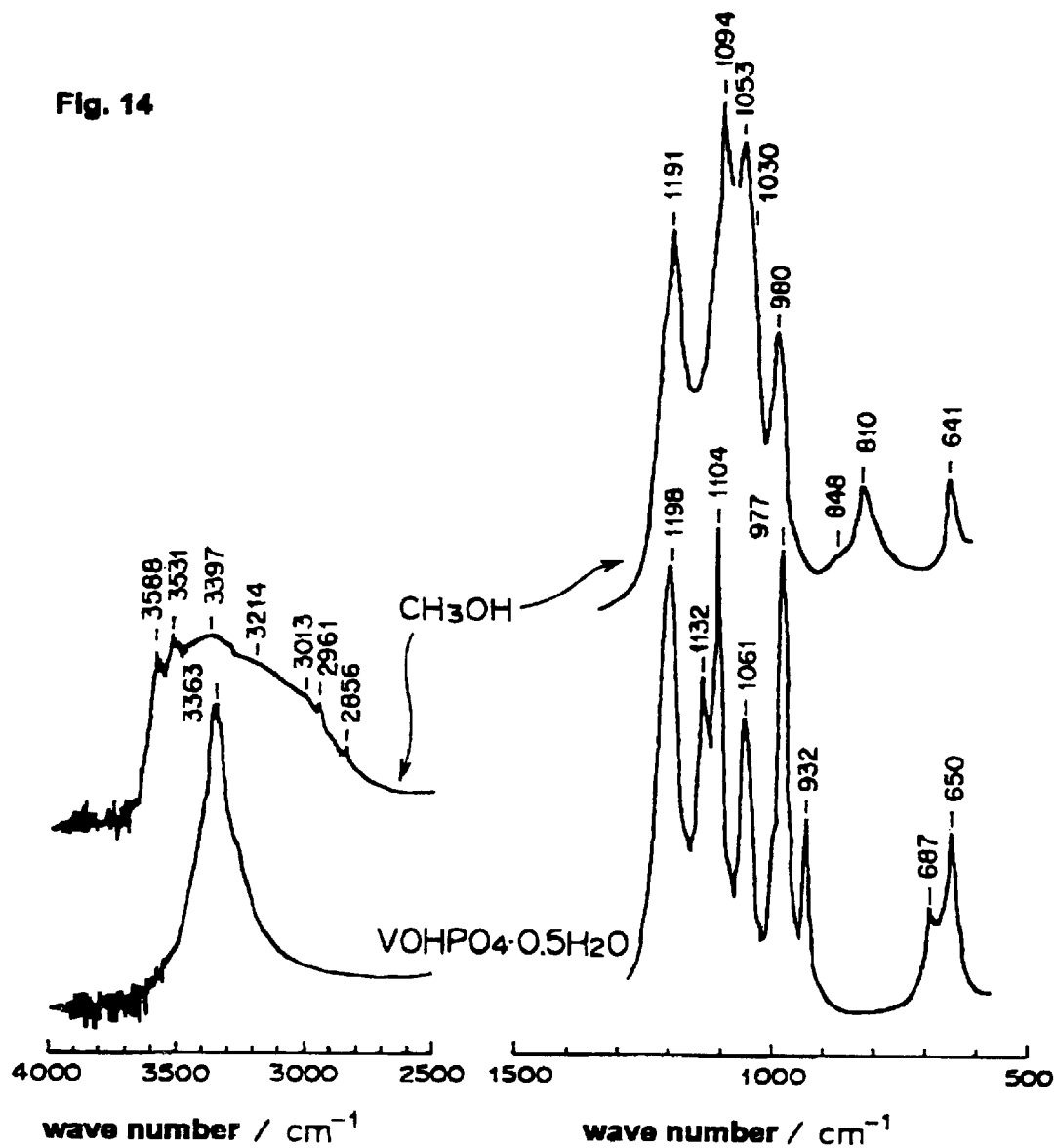
FIG. 14 is a chart which shows the infrared spectra of $VOHOP_4 \cdot 0.5H_2O$ and the intercalation compound prepared in Example 4.
Figure 15:
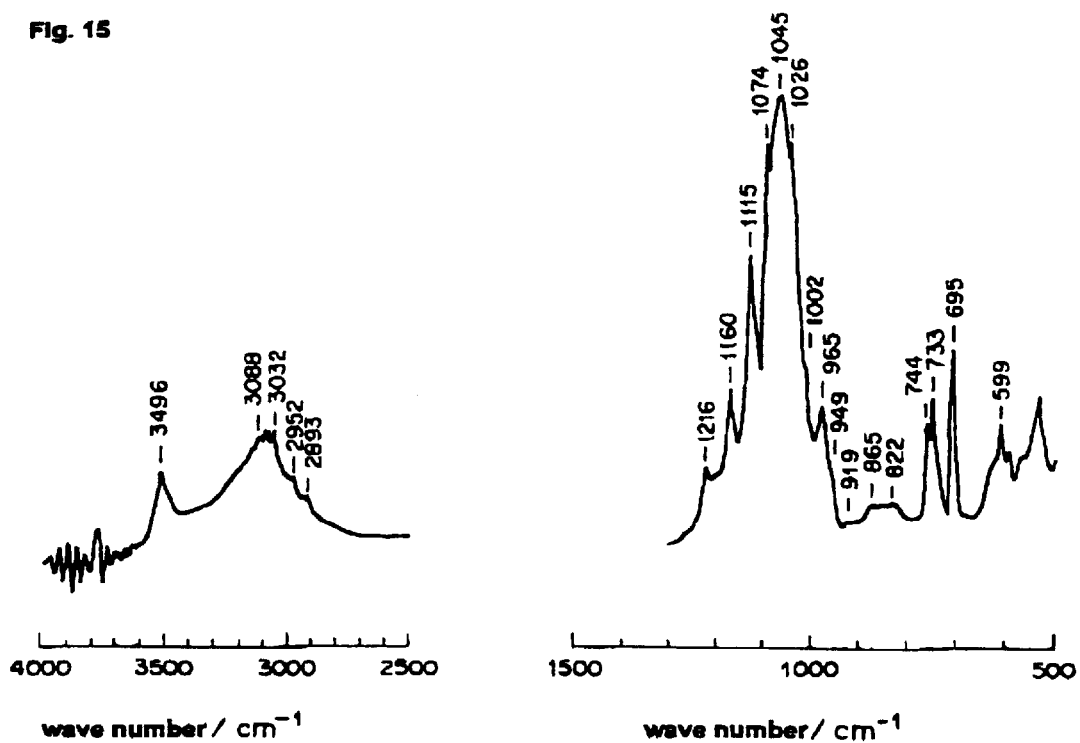
FIG. 15 is a chart which shows the infrared spectrum of the intercalation compound prepared in Example 1.
Figure 16:
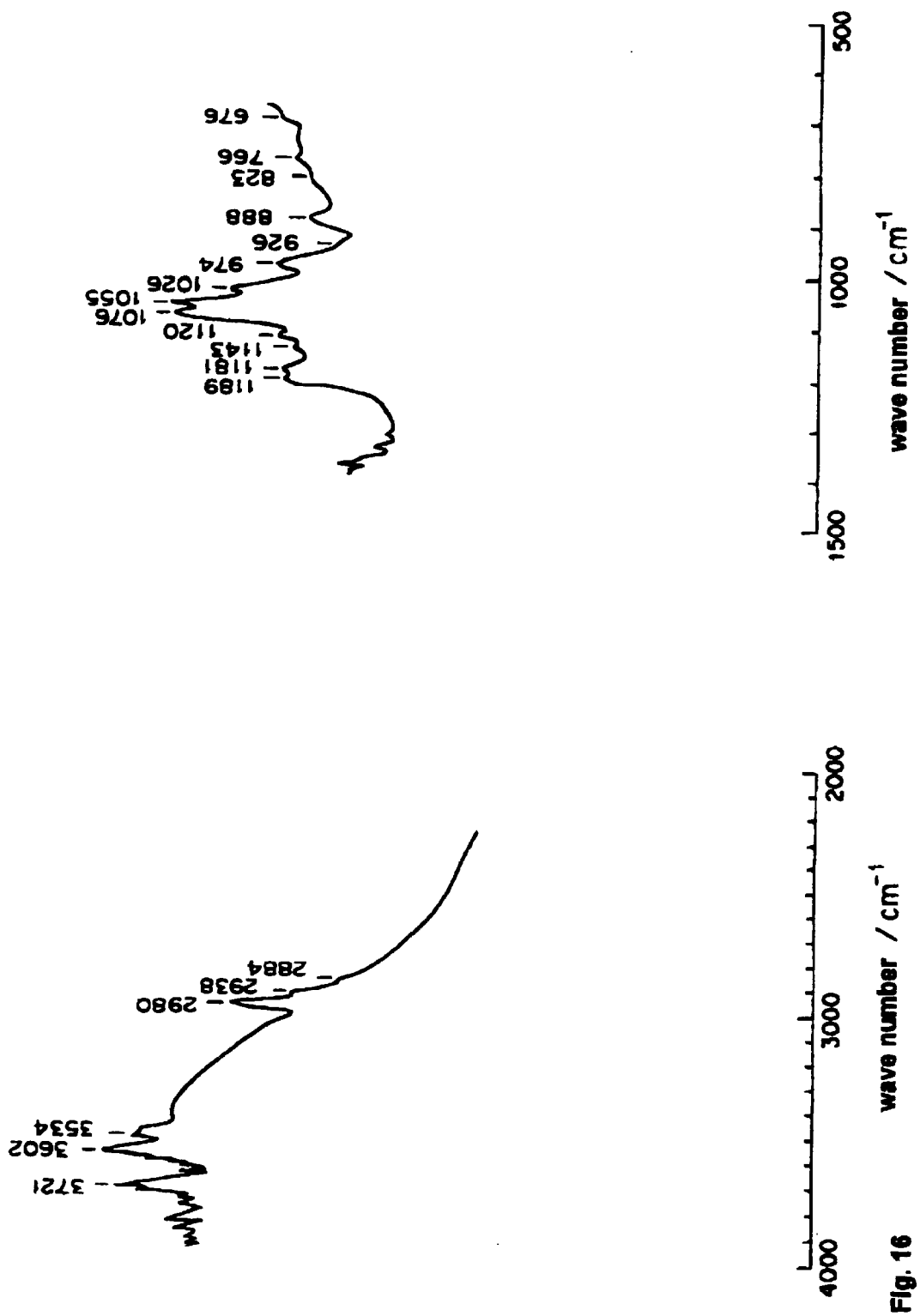
FIG. 16 is a chart which shows the infrared spectrum of the intercalation compound prepared in Example 10.
Figure 17:
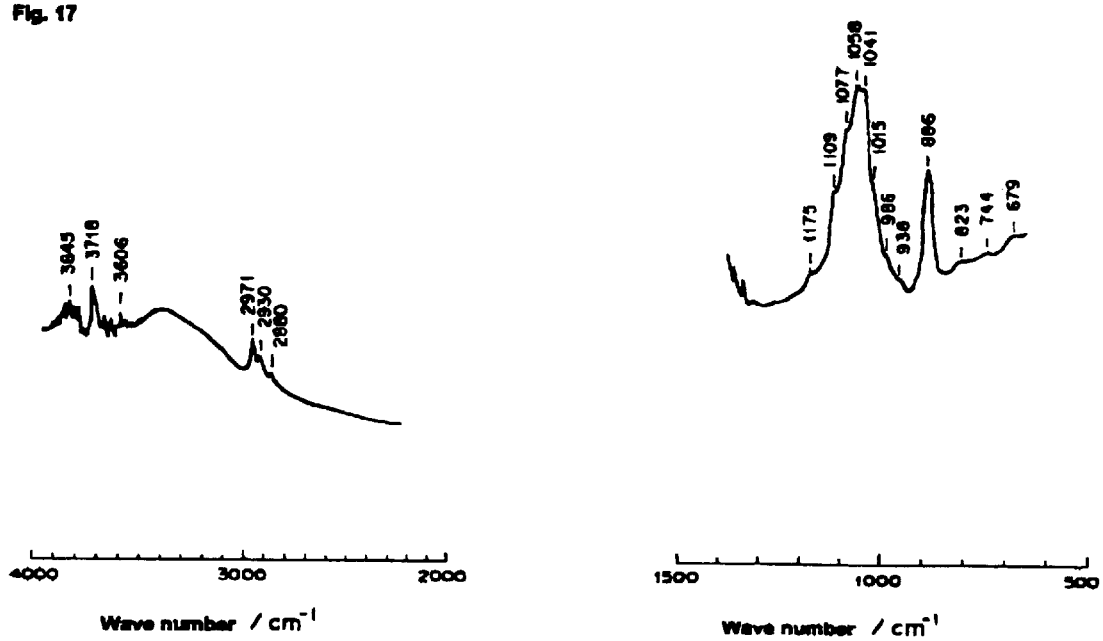
FIG. 17 is a chart which shows the infrared spectrum of the intercalation compound prepared in Example 11.
Figure 18:
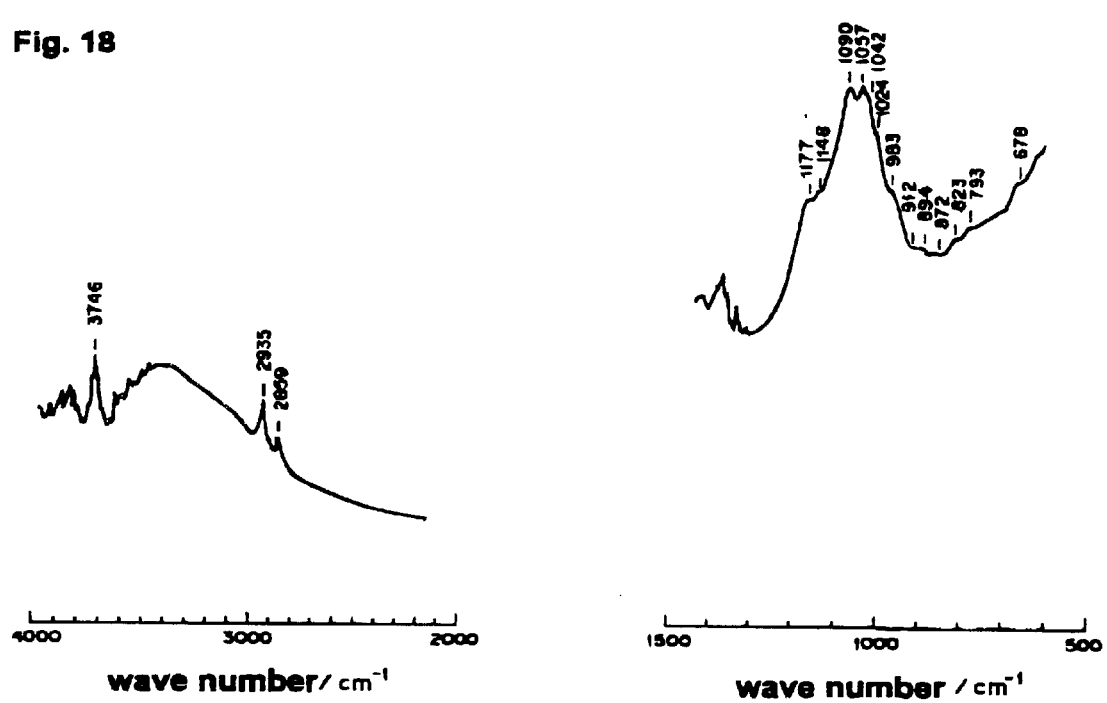
FIG. 18 is a chart which shows the infrared spectrum of the intercalation compound prepared in Example 12.
Figure 19:
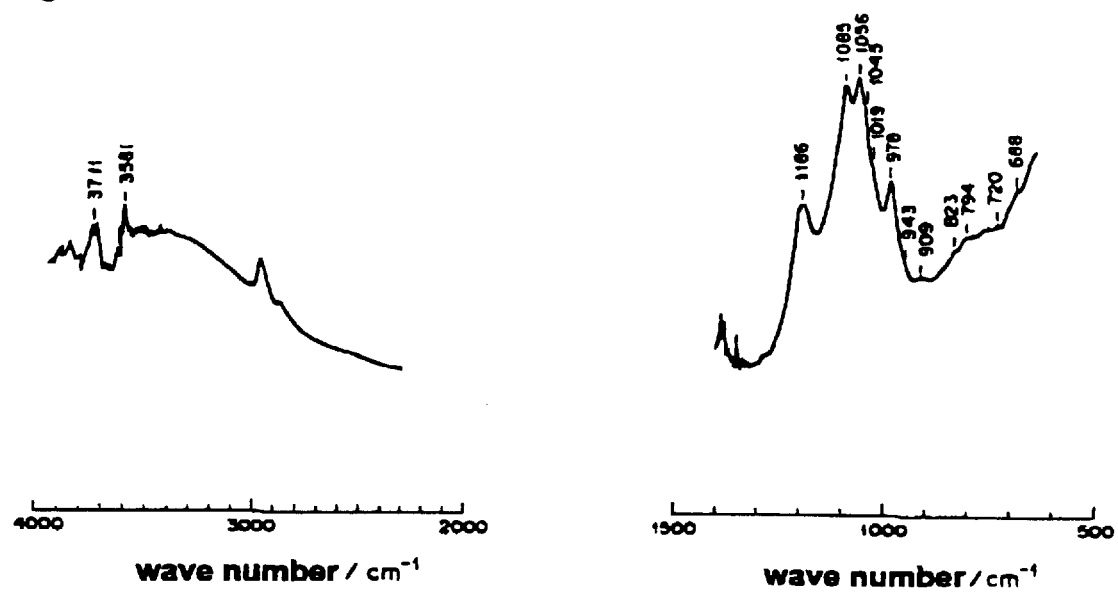
FIG. 19 is a chart which shows the infrared spectrum of the intercalation compound prepared in Example 13.

The structure of the present intercalation compound was further analyzed by infrared spectroscopy. FIG. 14 shows the infrared (IR) spectra of $VOHOP_4.0.5H_2O$ and the intercalation compound (methanol) prepared in Example 4; FIG. 15 shows the IR spectrum of the intercalation compound (benzyl alcohol) prepared in Example 1; FIG. 16 shows the IR spectrum of the intercalation compound (2-propanol) prepared in Example 10; FIG. 17 shows the IR spectrum of the intercalation compound (2-butanol) prepared in Example 11; FIG. 18 shows the IR spectrum of the intercalation compound (cyclohexanol) prepared in Example 12; and FIG. 19 shows the IR spectrum of the intercalation compound (cyclopentanol) prepared in Example 13. The absorption bands of $VOHOP_4.0.5H_2O$ were assigned according to the data described in the literatures, J. Catal., 99, 400(1986), and J. Catal, 141, 671(1993). The absorption bands of the intercalation compounds prepared in Examples 1, 4, 10, 11, 12 and 13 were assigned by comparing the bands with IR spectra of $VOHOP_4.0.5H_2O$, methanol, benzyl alcohol, 2-propanol, 2-butanol, cyclohexanol, cyclpentanol, and trialkyl phosphate. From the IR spectra, it was found that there are the bands assigned to the moiety, POC, i.e., 810 $cm^{-1}$ and 1030 $cm^{-1}$ for methanol, 744 $cm^{-1}$ and 1026 $cm^{-1}$ for benzyl alcohol, 888 $cm^{-1}$ and 1026 $cm^{-1}$ for 2-propanol, 886 $cm^{-1}$ and 1015 $cm^{-1}$ for 2-butanol, 894 $cm^{-1}$ and 1024 $cm^{-1}$ for cyclohexanol, and 909 $cm^{-1}$ and 1019 $cm^{-1}$ for cyclopenatnol, and those assigned to the isolated moiety, COH, 3531 $cm^{-1}$ and 3588 $cm^{-1}$ for methanol, 3496 $cm^{-1}$ for benzyl alcohol, 3534 $cm^{-1}$, 3602 $cm^{-1}$ and 3721 $cm^{-1}$ for 2-propanol, 3606 $cm^{-1}$ and 3718 $cm^{-1}$ for 2-butanol, 3746 $cm^{-1}$ for cyclohexanol, and 3581 $cm^{-1}$ and 3711 $cm^{-1}$ for cyclopentanol in the intercalation compounds prepared in Examples 1, 4, 10, 11, 12 and 13, but not in $VOHOP_4.0.5H_2O$.

Figure 20:
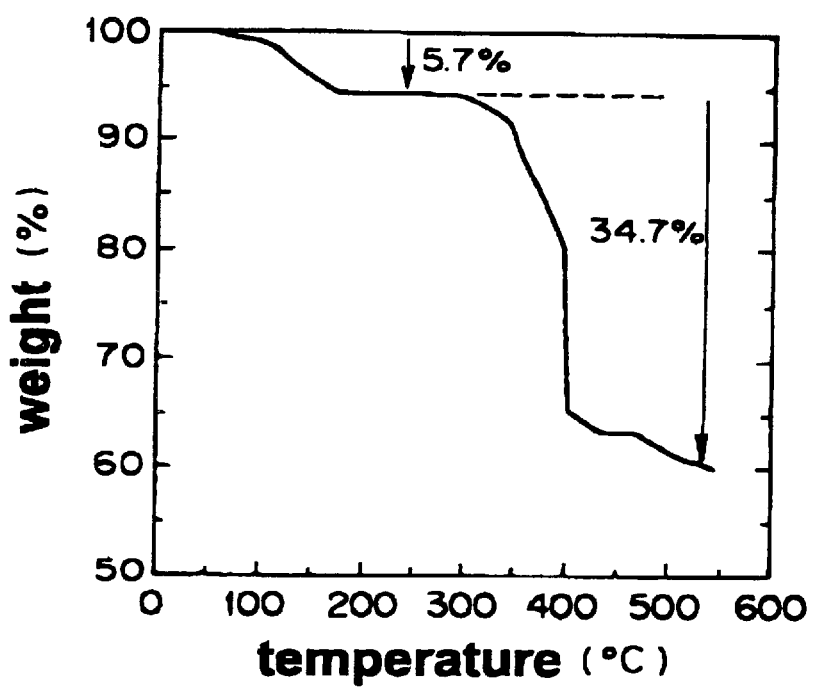
FIG. 20 is a thermogravimetric analysis chart of the intercalation compound prepared in Example 1.

FIG. 20 shows the results of the thermogravimetric analysis of the intercalation compound (with benzyl alcohol) prepared in Example 1. The weight loss of about 5.7 wt % at the lower temperature is considered to be caused by evaporation of benzyl alcohol and water present between the layers. The weight loss of about 34.7 wt % at the higher temperature is considered to be caused by combustion of the esterified benzyl alcohol. The total weight loss was about 40.4 wt %. The chemical formula for the compound with intercalated benzyl alcohol prepared in Example 1 is inferred to be $VO(C_6H_5CH_2OP)_{0.92}(HOP)_{0.08}O_3 \cdot 0.12(C_6H_5CH_2OH) \cdot 0.38(H_2O)$, from the result of the elemental analysis (V: 19.1 wt %, P:12.2 wt %, O:32.7 wt %, H:3.1 wt %, C:32.9 wt %). Assuming that the benzyl alcohol and water are removed in losing the weight at the lower temperature to change the structure, $0.12(C_6H_5CH_2OH) \cdot 0.38(H_2O)$, to $VO(C_6H_5CH_2OP)_{0.92}(Hop)_{0.08}O_3$, the theoretical weight loss is 7.5 wt %, which does not agree with the measured value of about 5.7 wt %. However, this discrepancy takes place because sample pre-treatment conditions are different between the elemental analysis and the thermal analysis so that the amount of benzyl alcohol or water physically adsorbed might be different. Then, it can be concluded that both of the weight loss values agree well with each other. Assuming that the ester-bonded benzyl alcohol is burnt to form $[VOPO_4]$ to thereby cause the weight loss at the higher temperature, the theoretical weight loss is 34.6 wt %, which agrees well with the aforesaid measured value of 34.7 wt %. This supports the aforesaid assumption that the weight loss at the higher temperature is caused by the combustion of the ester-bonded monohydric alcohol. The weight loss at the lower temperature was associated with an endothermic reaction, while the one at the higher temperature was associated with an exothermic reaction. Based on the above, it is concluded that benzyl alcohol is intercalated in the forms of free benzyl alcohol and phosphate ester between layers.

Figure 21:
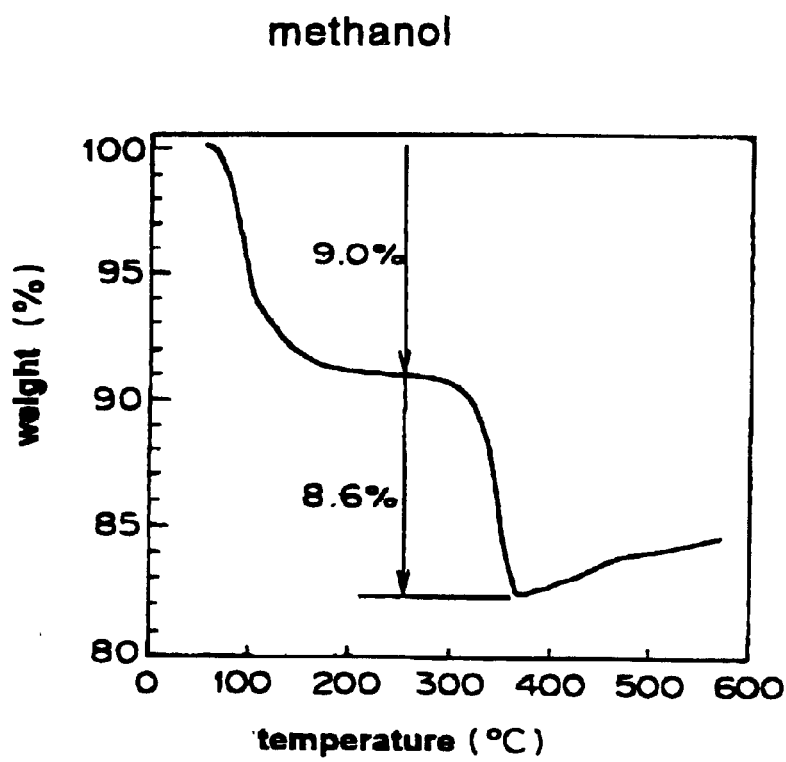
FIG. 21 is a thermogravimetric analysis chart of the intercalation compound prepared in Example 4.

FIG. 21 shows the result of thermogravimetric analysis of the compound with intercalated methanol prepared in Example 4. The weight loss at the lower temperature of about 9.0 wt % is considered to be caused by evaporation of methanol present between the layers and the loss at the higher temperature of about 8.6 wt % is considered to be caused by combustion of the ester-bonded methanol. The weight loss totaled to about 17.6 wt %. The chemical formula of the compound with intercalated methanol prepared in Example 4 is inferred to be $VO(CH_3OP)_{0.50}(HOP)_{0.50}O_3 \cdot 0.50(CH_3OH)$, from the result of elemental analysis (V: 28.1 wt %, P:17.4 wt %, O:44.6 wt %, H:6.5 wt %, C:2.0 wt %). Assuming that the weight loss at the lower temperature is caused by evaporation of the methanol, the theoretical weight loss is 8.6 wt %, which agree well with the aforesaid measured value of about 9.0 wt %. Assuming that the weight loss at the higher temperature is caused by combustion of the ester -bonded methanol, the theoretical weight loss is 8.6 wt %, which agrees with the aforesaid measured value of 8.6 wt %. This supports the aforesaid assumption that the weight loss at the higher temperature is caused by the combustion of the ester-bonded methanol. The weight loss at the lower temperature was associated with an endothermic reaction, while the one at the higher temperature was associated with an exothermic reaction. Based on the above, it is concluded that methanol is intercalated in the forms of methanol and phosphate ester between layers.

Figure 22:
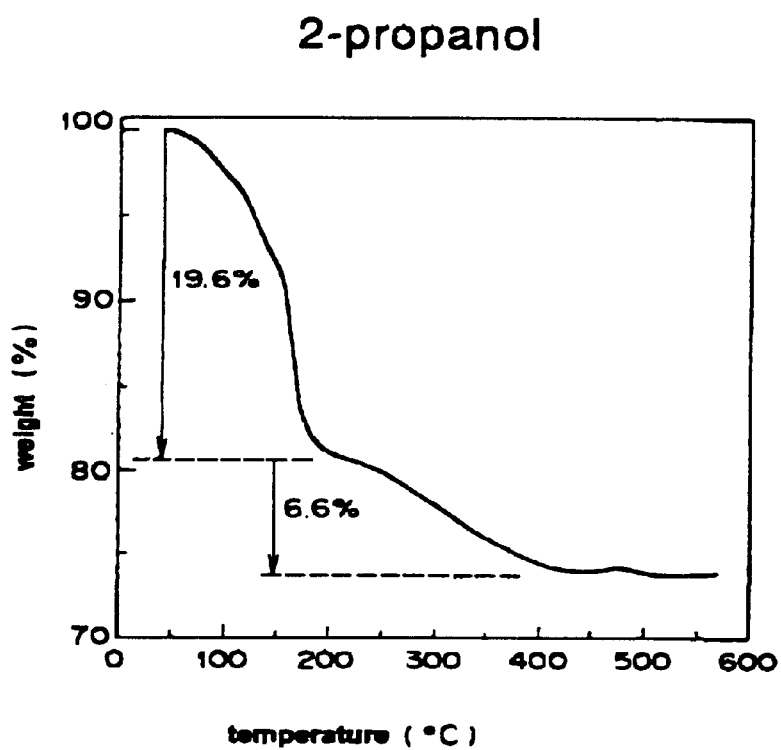
FIG. 22 is a thermogravimetric analysis chart of the intercalation compound prepared in Example 10.

FIG. 22 shows the result of thermogravimetric analysis of the compound with intercalated 2-propanol prepared in Example 10. The weight loss at the lower temperature of about 19.6 wt % is considered to be caused by evaporation of 2-propanol present between the layers and the loss at the higher temperature of about 6.6 wt % is considered to be caused by combustion of the ester-bonded 2-propanol. The weight loss totaled to about 26.2 wt %. The chemical formula of the compound with intercalated 2-propanol prepared in Example 10 is inferred to be $VO(C_3H_7OP)_{0.13}(HOP)_{0.87}O_3 \cdot 0.92(C_3H_7OH)$, from the result of elemental analysis (V: 24.3 wt %, P:15.9 wt %, O:40.2 wt %, H:3.5 wt %, C:16.2 wt %). Assuming that the weight loss at the lower temperature is caused by the loss of 2-propanol, i.e., 0.92 $(C_3H_7OH)$, to form VO $(C_3H_7OP)_{0.13}(HOP)_{0.87}O_3$, the weight loss is theoretically 25.0 wt %, which deviates a little from the aforesaid measured value of about 19.6 wt %. However, for the same reason as mentioned above, it can be concluded that both of the weight loss values agree well with each other. Assuming that the ester-bonded 2-propanol is burnt to form [$VOPO_4$], the theoretical weight loss is 6.4 wt %, which agrees with the aforesaid measured value of 6.6 wt %. This supports the aforesaid assumption that the weight loss at the higher temperature is caused by the combustion of the ester-bonded monohydric alcohol. The weight loss at the lower temperature was associated with an endothermic reaction, while the one at the higher temperature was associated with an exothermic reaction. Based on the above, it is concluded that 2-propanol is intercalated in the forms of free 2-propanol and phosphate ester between layers. Although the detail structure is unknown at present, it is speculated from the inferred chemical formula of the compound with intercalated 2-propanol that 2-propanol replaces all of the $H_2O$ contained in [(VO) (HOP)$O_3 \cdot 0.5H_2O$], and additional 2-propanol is intercalated between layers.

Figure 23:
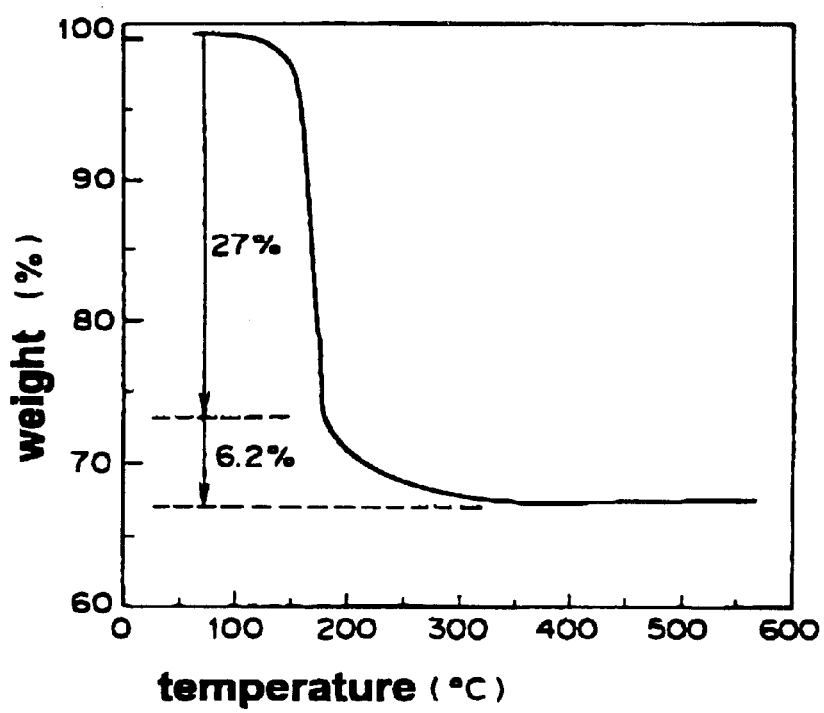
FIG. 23 is a thermogravimetric analysis chart of the intercalation compound prepared in Example 11.

FIG. 23 shows the result of thermogravimetric analysis of the compound with intercalated 2-butanol prepared in Example 11. The weight loss at the lower temperature of about 27 wt % is considered to be caused by evaporation of 2-butanol present between the layers and the loss at the higher temperature of about 6.2 wt % is considered to be caused by combustion of the ester-bonded 2-butanol. The weight loss totaled to about 33.2 wt %. The chemical formula of the compound with intercalated 2-butanol prepared in Example 11 is inferred to be $VO(C_4H_9OP)_{0.10}(HOP)_{0.90}O_3 \cdot 0.95(C_4H_9OH)$, from the result of elemental analysis (V: 21.0 wt %, P:13.7 wt %, O:39.9 wt %, H:4.8 wt %, C:20.7 wt %). Assuming that the weight loss at the lower temperature is caused by the loss of 2-butanol, i.e., $0.95(C_4H_9OH)$ to form [$VO(C_4H_9OP)_{0.10}(HOP)_{0.90}O_3$], the theoretical weight loss is 29.7 wt %, which deviates a little from the aforesaid measured value of about 27 wt %. However, for the same reason as mentioned above, it can be concluded that both of the weight loss values agree well with each other. Assuming that the ester-bonded 2-propanol is burnt to form [$VOPO_4$], the theoretical weight loss is 6.1 wt %, which agrees with the aforesaid measured value of about 6.2 wt %. This supports the aforesaid assumption that the weight loss at the higher temperature is caused by the combustion of the ester-bonded monohydric alcohol. The weight loss at the lower temperature was associated with an endothermic reaction, while the one at the higher temperature was associated with an exothermic reaction. Based on the above, it is concluded that 2-butanol is intercalated in the forms of free 2-butanol and phosphate ester between layers. Further, as in the above-described compound with intercalated 2-propanol, the compound with intercalated 2-butanol is inferred to have a structure where 2-butanl replaces all of the $H_2O$ contained in [(VO)(HOP)$O_3 \cdot 0.5H_2O$] and additional 2-butanol is intercalated between layers.

Figure 24:
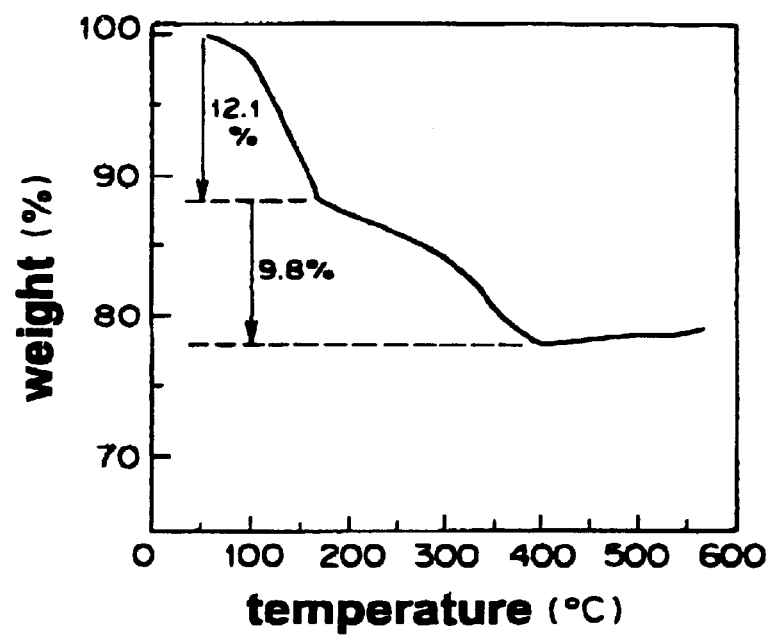
FIG. 24 is a thermogravimetric analysis chart of the intercalation compound prepared in Example 12.

FIG. 24 shows the result of thermogravimetric analysis of the compound with intercalated cyclohexanol prepared in Example 12. The weight loss at the lower temperature of about 12.1 wt % is considered to be caused by evaporation of cyclohexanol and water present between layers and the loss at the higher temperature of about 9.8 wt % is considered to be caused by combustion of the ester-bonded cyclohexanol. The weight loss totaled to about 21.9 wt %. The chemical formula of the compound with intercalated cyclohexanol prepared in Example 12 is inferred to be $VO(C_6H_{11}OP)_{0.12}(HOP)_{0.88}O_3 \cdot 0.26(C_6H_{11}OH) \cdot 0.24(H_2O)$ from the result of elemental analysis (V: 24.9 wt %, P;16.1 wt %, O:42.6 wt %, H:2.9 wt %, C:13.5 wt %). Assuming that the weight loss at the lower temperature is caused by the loss of cyclohexanol and water, $0.26(C_6H_{11}OH) \cdot 0.24(H_2O)$, to form $VO(C_6H_{11}OP)_{0.12}(HOP)_{0.88}O_3$, the weight loss is theoretically 14.9 wt %, which deviates a little from the aforesaid measured value of about 12.1 wt %. However, for the same reason as mentioned above, it can be concluded that both of the weight loss values agree well with each other. Assuming that the ester-bonded cyclohexanol is burnt to form [$VOPO_4$], the theoretical weight loss is 9.8 wt %, which agrees with the aforesaid measured value of about 9.8 wt %. This supports the aforesaid assumption that the weight loss at the higher temperature is caused by the combustion of the ester-bonded monohydric alcohol. The weight loss at the lower temperature was associated with an endothermic reaction, while the one at the higher temperature was associated with an exothermic reaction. Based on the above, it is concluded that cyclohexanol is intercalated in the forms of free cyclohexanol and phosphate ester between layers.

FIG. 25 shows the result of thermogravimetric analysis of the compound with intercalated cyclopentanol prepared in Example 13. The weight loss at the lower temperature of about 9.8 wt % is considered to be caused by evaporation of cyclopentanol and water present between layers and the loss at the higher temperature of about 10.1 wt % is considered to be caused by combustion of the ester-bonded cyclopentanol. The weight loss totaled to about 19.9 wt %. The chemical formula of the compound with intercalated cyclohexanol prepared in Example 13 is inferred to be $VO(C_5H_9OP)_{0.16}(HOP)_{0.74}O_3 \cdot 0.3(C_5H_9OH) \cdot 0.2(H_2O)$, from the result of elemental analysis (V: 25.4 wt %, P:15.7 wt %, O:39.4 wt %, H:2.8 wt %, C:16.7 wt %). Assuming that the weight loss at the lower temperature is caused by the loss of cyclopentanol and water, i.e., $0.3(C_5H_9OH) \cdot 0.2(H_2O)$, to form $VO(C_5H_9OP)_{0.16}(HOP)_{0.74}O_3$, the weight loss is theoretically 14.5 wt %, which deviates a little from the aforesaid measured value of about 9.8 wt %. However, for the same reason as mentioned above, it can be concluded that both of the weight loss values agree well with each other. Assuming that the ester-bonded cyclopentanol is burnt to leave $[VOPO_4]$, the theoretical weight loss is 9.8 wt %, which agrees almost with the aforesaid measured value of about 10.1 wt %. The weight loss at the lower temperature was associated with an endothermic reaction, while the one at the higher temperature was associated with an exothermic reaction. Based on the above, it is concluded that cyclopentanol is intercalated in the forms of free cyclopentanol and phosphate ester between layers.

As described above, monohydric alcohol was found to exist both in the form of alcohol and in the form of phosphate ester in the present intercalation compound. It was also found that the present compound has a structure where the whole or a part of the moiety, POH, in (VO)$(HOP)O_3 \cdot 0.5H_2O$ is replaced with the moiety, POR, of phosphoric acid ester of monohydric alcohol, wherein R is the residue of the monohydric alcohol, and the whole or a part of $0.5H_2O$ is replaced with monohydric alcohol.

Examples 21 to 31 and Comparative Examples 9 to 22

As shown in Tables 1 and 2, vanadium-phosphorus mixed oxides were prepared by heat treating, in various conditions, the compounds prepared in the aforesaid Examples and Comparative Examples. The heat treatment was performed by placing 1.5 g of each of the compounds in a Pyrex® glass tube and heating the tube in a 20 ml/min. flow of nitrogen gas containing oxygen in the concentration shown in Table 1 for 1 hour. After cooled to room temperature, a black solid of vanadium-phosphorus mixed oxide was obtained. A BET specific surf ace area and a micropore volume of the black solid were measured.

TABLE 1

|  | Ex. 21 | Ex. 22 | Ex. 23 | Ex. 24 | Ex. 25 | Ex. 26 | Ex. 27 |
|---|---|---|---|---|---|---|---|
| Heating Conditions | | | | | | | |
| Sample | Ex. 6 | Ex. 6 | Ex. 6 | Ex. 6 | Ex. 6 | Ex. 6 | Ex. 6 |
| Monohydric alcohol*[1] Species | 1-BuOH | 1-BuOH | 1-BuOH | 1-BuOH | 1-BuOH | 1-BuOH | 1-BuOH |
| Temperature (° C.) | 338 | 265 | 280 | 295 | 345 | 370 | 430 |
| Oxygen content (vol %)*[2] | 0 | 0 | 0 | 0 | 0 | 0 | 0 |
| Vadium-Phosphorus Mixed Oxide | | | | | | | |
| BET specific surface area (m²/g) | 249 | 188 | 222 | 224 | 222 | 221 | 196 |
| Total micropore volume (mm³/g) | 417.0 | 293.1 | 371.6 | 396.2 | 406.8 | 425.9 | 386.0 |
| Micropore volume ratio, r = 1 to 2.3 nm (%) | 92.3 | 81.3 | 82.0 | 82.2 | 82.9 | 81.0 | 81.4 |
| Micropore volume, r = 1 to 100 nm (mm³/g) | 272.5 | 196.1 | 242.0 | 267.4 | 274.6 | 296.1 | 272.0 |
| Micropore volume, r < 1 nm (mm³/g) | 144.5 | 97.0 | 129.6 | 128.8 | 132.2 | 129.8 | 114.0 |

|  | Ex. 28 | Ex. 29 | Ex. 30 | Ex. 31 |
|---|---|---|---|---|
| Heating Conditions | | | | |
| Sample | Ex. 6 | Ex. 5 | Ex. 8 | Ex. 11 |
| Monohydric alcohol*[1] Species | 1-BuOH | 1-PrOH | 1-OctOH | 2-BuOH |
| Temperature (° C.) | 338 | 353 | 330 | 330 |
| Oxygen content (vol %)*[2] | 1.0 | 0 | 0 | 0 |
| Vadium-Phosphorus Mixed Oxide | | | | |
| BET 比表面積 (m²/g) | 176.7 | 146.1 | 187.0 | 403.8 |
| 全細孔容積 (mm³/g) | 292.4 | 109.3 | 571.7 | 864.4 |
| Micropore volume ratio, r = 1 to 2.3 nm (%) | 91.8 | 80.6 | 93.6 | 86.9 |
| Micropore volume, r = 1 to 100 nm (mm³/g) | 196.5 | 109.3 | 447.5 | 569.7 |
| Micropore volume, r < 1 nm (mm³/g) | 95.9 | 36.8 | 124.2 | 294.7 |

*[1]In the Tables, 1-BuOH stands for 1-butanol; 1-PrOH for 1-propanol; 1-OctOH for 1-octanol; 2-BuOH for 2-butanol; MeOH for methanol; EtOH for ethanol; Cyhex for cyclohexanol; and BzOH for benzyl alcohol.
*[2]Nitrogen gas was used as an inert gas, and the oxygen content is based on the total gas volume.

TABLE 2

|  | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|
| Heating Conditions | | | | | | | | |
| Sample | Ex. 6 | Ex. 6 | Ex. 6 | Ex. 6 | Ex. 6 | Ex. 6 | Ex. 6 | Ex. 6 |
| Monohydric alcohol*[1] Species | 1-BuOH | 1-BuOH | 1-BuOH | 1-BuOH | 1-BuOH | 1-BuOH | 1-BuOH | 1-BuOH |

TABLE 2-continued

| | | | | | | | | |
|---|---|---|---|---|---|---|---|---|
| Temperature (° C.) | 220 | 235 | 250 | 500 | 338 | 338 | 338 | 295 |
| Oxygen content (vol %)*[2] | 0 | 0 | 0 | 0 | 2.5 | 5.0 | 20 | 20 |
| Vadium-Phosphorus Mixed Oxide | | | | | | | | |
| BET specific surface area (m$^2$/g) | 9.2 | 6.0 | 54.9 | 35.8 | 46.0 | 45.8 | 12.8 | 10.9 |
| Total micropore volume (mm$^3$/g) | 39.2 | 49.2 | 88.3 | 126.3 | 80.4 | 82.3 | 81.1 | 76.3 |
| Micropore volume ratio, r = 1 to 2.3 nm (%) | 25.7 | 38.4 | 47.8 | 70.2 | 83.5 | 82.6 | 31.6 | 24.8 |
| Micropore volume, r = 1 to 100 nm (mm$^3$/g) | 39.2 | 49.2 | 61.6 | 114.0 | 58.9 | 61.4 | 81.1 | 76.3 |
| Micropore volume, r < 1 nm (mm$^3$/g) | 0.0 | 0.0 | 26.7 | 12.3 | 21.5 | 20.9 | 0.0 | 0.0 |

| | Comp. Ex. 17 | Comp. Ex. 18 | Comp. Ex. 19 | Comp. Ex. 20 | Comp. Ex. 21 | Comp. Ex. 22*[3] |
|---|---|---|---|---|---|---|
| Heating Conditions | | | | | | |
| Sample | Ex. 4 | Ex. 4 | Ex. 14 | Ex. 12 | Ex. 1 | Comp.Ex. 1 |
| Monohydric alcohol*[1] Species | MeOh | MeOh | EtOH | CyHexOH | BzOH | — |
| Temperature (° C.) | 230 | 390 | 360 | 410 | 403 | 550 |
| Oxygen content (vol %)*[2] | 0 | 0 | 0 | 0 | 0 | 0 |
| Vadium-Phosphorus Mixed Oxide | | | | | | |
| BET specific surface area (m$^2$/g) | 25.1 | 35.7 | 25.3 | 37.6 | 20.0 | 33.0 |
| Total micropore volume (mm$^3$/g) | 154.3 | 194.7 | 129.5 | 242.4 | 106.5 | 124.7 |
| Micropore volume ratio, r = 1 to 2.3 nm (%) | 6.8 | 15.0 | 26.9 | 5.5 | 7.6 | 29.2 |
| Micropore volume, r = 1 to 100 nm (mm$^3$/g) | 152.2 | 189.1 | 129.5 | 242.4 | 106.5 | 124.7 |
| Micropore volume, r < 1 nm (mm$^3$/g) | 2.1 | 5.6 | 0.0 | 0.0 | 0.0 | 0.0 |

*[1]In the Tables, 1-BuOH stands for 1-butanol; 1-PrOH for 1-propanol; 1-OctOH for 1-octanol; 2-BuOh for 2-butanol; MeOH for methanol; EtOH for ethanol; Cyhex for cyclohexanol; and BzOH for benzyl alcohol.
*[2]Nitrogen gas was used as an inert gas, and the oxygen content is based on the total gas volume.
*[3]Comparative Example where vanadyl hydrogen phosphate hemlhydrate was used.

In Example 21, the compound with intercalated 1-butanol prepared in Example 6 was heat treated in an nitrogen atmosphere at 338° C. The BET specific surface area, total micropore volume and ratio of micropores having a radius of from 1 to 2.3 nm were remarkably large. In Examples 22 to 27, the heat treatment temperature varied within the present range. The BET specific surface area, total micropore volume and ratio of micropores having a radius of from 1 to 2.3 nm were all good. In Example 28, the heat treatment performed in Example 21 was repeated except that the heating atmosphere was changed to nitrogen which contained oxygen at 1.0 vol %. Although the BET specific surface area, total micropore volume and ratio of micropores having a radius of from 1 to 2.3 nm decreased slightly, they were still satisfactory. In Examples 29 to 31, the compounds with intercalated 1-propanol, 1-octanol, or 2-butanol were heat treated at 353° C., 330° C. and 330° C., respectively, in a nitrogen atmosphere. The BET specific surface area, total micropore volume and ratio of micropores having a radius of from 1 to 2.3 nm were all good.

Meanwhile, in Comparative Examples 9 to 12, Example 21 was repeated except that the heating temperature was out of the present range. In all of these Comparative Examples, the BET specific surface area was so little as less than 80 m$^2$/g and the ratio of micropores having a radius of from 1 to 2.3 nm was not satisfactory. In Comparative Examples 13 to 15, Example 21 was repeated except that the O$_2$ content in the heat treatment atmosphere was out of the present range. The BET specific surface area, total micropore volume and ratio of micropores having a radius of from 1 to 2.3 nm were unsatisfactory. In Comparative Example 16, Example 24 was repeated except that the O$_2$ content in the heat treatment atmosphere was out of the present range. The BET specific surface area, total micropore volume and ratio of micropores having a radius of from 1 to 2.3 nm were worse. In Examples 17 and 18, the compounds with intercalated methanol were heat treated The BET specific surface area, total micropore volume and ratio of micropores having a radius of from 1 to 2.3 nm were unsatisfactory. In Examples 19, 20 and 21, the compounds with intercalated ethanol, cyclohexanol, and benzyl alcohl were heat treated, respectively. The BET specific surface area, total micropore volume and ratio of micropores having a radius of from 1 to 2.3 m in these compounds were unsatisfactory. In Comparative Example 22, widely used catalyst for the production of maleic anhydride, i.e., vanadyl hydrogen phosphate hemihydrate prepared in Comparative Example 1 was heat treated at a conventionally employed temperature. The resultant BET specific surface area was low.

FIG. 26 shows the X-ray pattern of the oxide prepared by heat treating the compound with intercalated 1-butanol prepared in Example 6. Table 3 below shows the result of elemental analysis of the oxide. The oxide had an amorphous structure and no periodical structure such as a hexagonal structure was observed.

TABLE 3

| Element | wt % | Molar ratio |
|---|---|---|
| V | 30.9 | 1.0 |
| P | 18.7 | 1.0 |
| O | 45.4 | 4.7 |
| C | 4.6 | 0.7 |
| H | 0.4 | 0.7 |

What is claimed is:
1. A vanadium-phosphorus mixed oxide, characterized by a BET specific surface area of at least 80 m$^2$/g.
2. The mixed oxide according to claim 1 wherein a total micropore volume is at least 100 mm$^3$/g.
3. The mixed oxide according to claim 1 or 2, wherein a total volume of micropores having a radius smaller than 1 nm is at least 30 mm$^3$/g.
4. The mixed oxide according to claim 1, wherein a ratio of a total volume of micropores having a radius of from 1 to 2.3 nm to a total volume of micropores having a radius of from 1 to 100 nm is at least 50%.

* * * * *